United States Patent [19]

McCarthy et al.

[11] Patent Number: 5,350,590
[45] Date of Patent: Sep. 27, 1994

[54] PROTEIN FAT REPLACER AND METHOD OF MANUFACTURE THEREOF

[75] Inventors: Anthony J. McCarthy, Janesville; Jack W. Maegli, Beloit, both of Wis.

[73] Assignee: Beatreme Foods Inc., Beloit, Wis.

[21] Appl. No.: 990,610

[22] Filed: Dec. 15, 1992

[51] Int. Cl.⁵ ............... A21D 13/08; A23L 2/00; A23C 21/00
[52] U.S. Cl. ............... 426/549; 426/285; 426/556; 426/580; 426/583; 426/589; 426/590; 426/657; 426/658
[58] Field of Search ............ 426/580, 330.2, 583, 426/589, 549, 657, 285

[56] References Cited

U.S. PATENT DOCUMENTS

| | | | |
|---|---|---|---|
| 3,943,264 | 3/1976 | Davis | 426/330.2 |
| 4,748,034 | 5/1988 | de Rham | 426/330.2 |

FOREIGN PATENT DOCUMENTS

| | | |
|---|---|---|
| 0468560 | 6/1991 | European Pat. Off. |
| 2676450 | 5/1991 | France |

*Primary Examiner*—Donald E. Czaja
*Assistant Examiner*—Curtis E. Sherrer
*Attorney, Agent, or Firm*—Griffin Butler Whisenhunt & Kurtossy

[57] ABSTRACT

A water-dispersible, gravitational and heat-stable fat replacer composition for foods, which comprises co-formed agglomerates of at least partially denatured whey protein and desolubilized casein, where the mean size of the agglomerate is about 1 to 20 microns.

45 Claims, 18 Drawing Sheets

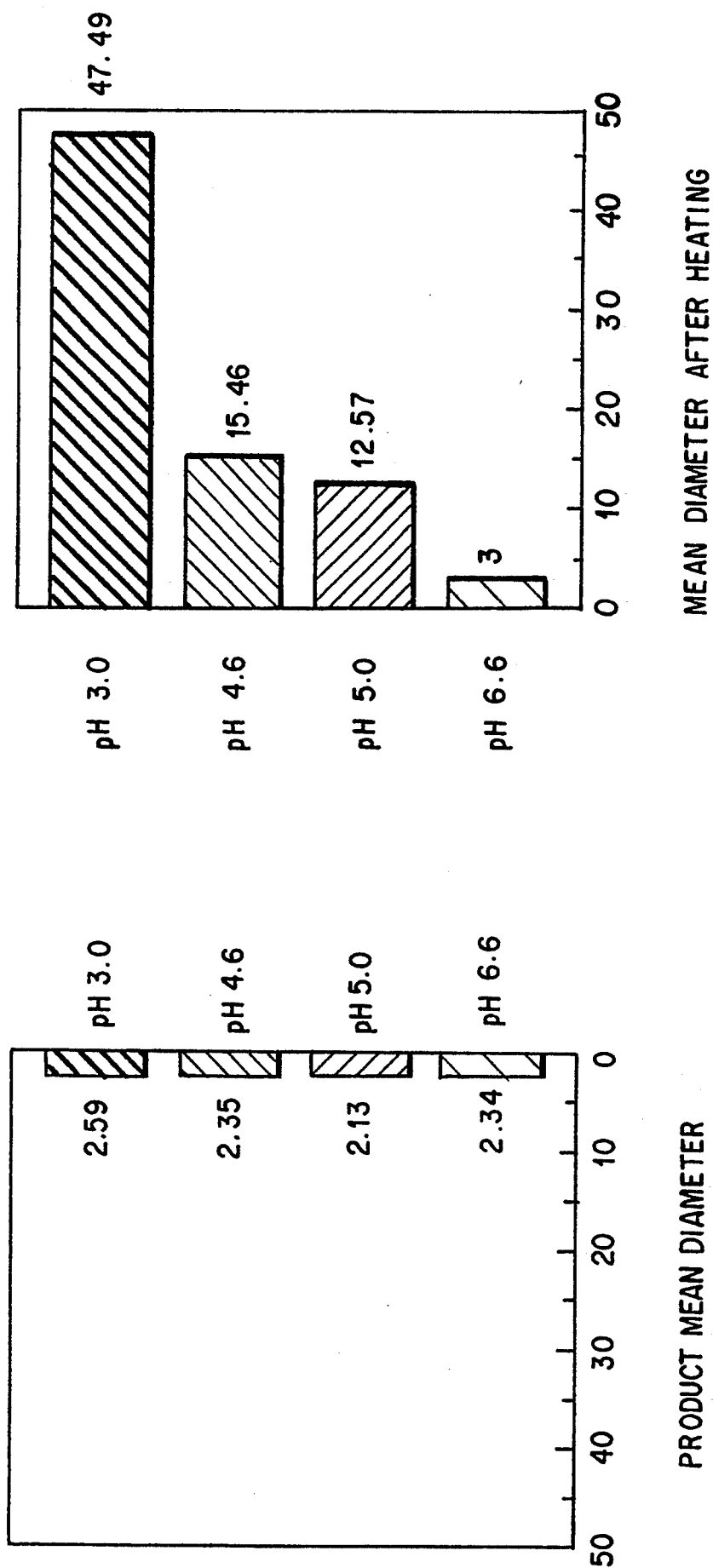

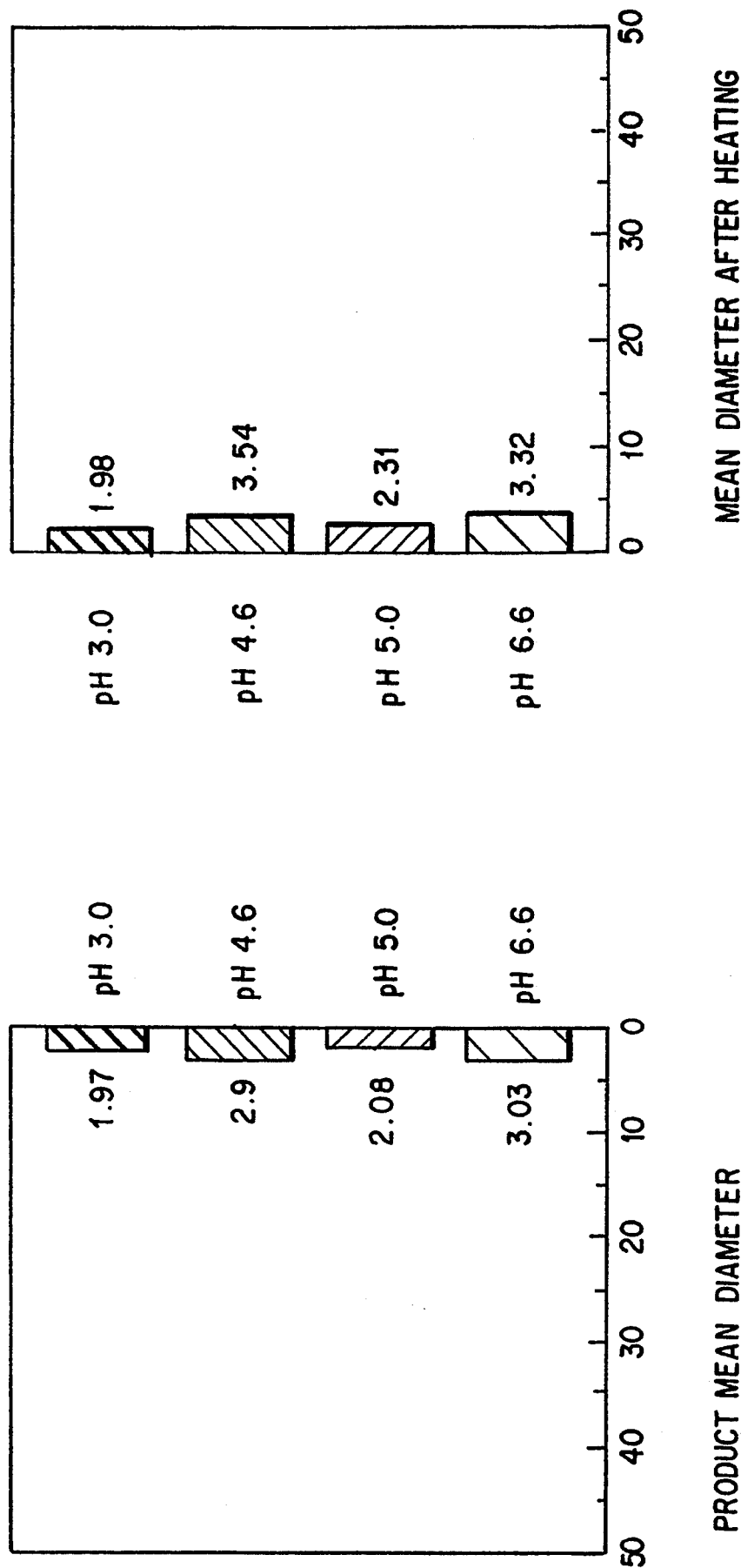

PROTEIN FAT REPLACER AND METHOD OF MANUFACTURE THEREOF

The present invention relates to a protein fat replacer for foods, and more particularly to such a replacer which is water dispersible and heat stable.

BACKGROUND OF THE INVENTION

A protein fat replacer is described in U.S. Pat. No. 4,734,287, to Singer, et al, and the present invention relates to an improvement therein. That Singer, et al patent describes, in detail, a proteinaceous, water-dispersible, fat replacer made of macrocolloidal particles of substantially non-aggregated denatured dairy whey protein. Since the description of that fat replacer is set forth in considerable detail in the Singer, et al patent, those descriptions will not be repeated herein, for the sake of conciseness, and the Singer, et al patent is referenced and relied upon herein for purposes of that disclosure.

Briefly, as set forth in the Singer, et al patent, heat denatured whey protein, having substantially non-aggregated particles with sizes of between about 0.1 and 2.0 microns, when hydrated, provide organoleptic properties which mimic fat/water emulsions, and, hence, may be used as a fat replacer in certain food compositions. That patent points out the theory by which the whey protein particles are produced, and according to that theory, whey protein, under denaturing conditions, undergoes first changes where the protein is denatured, and second changes where aggregated larger particles of the denatured protein are formed. The aggregated larger particles have particle sizes of about 15 to 175 microns, and particles of this size range do not have the fat mimicking organoleptic properties. According to the Singer, et al patent, by use of extremely high shear during the denaturing step, the larger aggregated particles are prevented from forming, and the resulting composition has, mainly, substantially non-aggregated denatured whey protein particles, i.e. particle sizes with a range of approximately 0.1 to 2.0 microns, which will provide the desired fat-mimicking organoleptic properties.

As characterized by the Singer, et al patent, the process produces novel whey proteins which are prepared by controlled or extent-limited heat denaturization under very high shear so as to prevent the formation of substantial amounts of large protein aggregates. In view of this method and the product which results therefrom, the Singer, et al patent also points out that in the event that the macrocolloid particles of the invention are, following their formation, subjected to additional denaturing temperatures or high heat treatments, the particles tend to form fused larger aggregates and hence lose the required organoleptic properties. Thus, the patent points out that the macrocolloid particles are heat labile and should be treated accordingly.

This disadvantage of the protein particles of the Singer, et al patent manifests itself when substantial amounts of those protein fat replacer particles are placed in food compositions which are intended to be heated, as opposed to those food compositions which are not intended to be heated. For example, this heat labile property of the Singer, et al particles may not be apparent in foods such as ice cream, and other frozen desserts, since limited heat treatment of the heat labile particles is practical, e.g. as low temperature-long time pasteurization. On the other hand, if those fat replacer particles are placed in food compositions which are intended to be heated to substantial high temperatures, e.g. above about 160° F., that heat labile property is very strikingly exhibited. For example, if the Singer, et al particles are used in sauce compositions, when the sauce composition is heated, e.g. a gravy heated on a steam table, for some period of time, the gravy forms a soft gel. In addition, the Singer, et al protein particles further aggregate, as acknowledged in the Singer, et al patent, and these larger aggregates not only lose the fat mimicking properties, but produce an unappetizing form of the sauce, e.g. gravy. In low viscosity compositions, e.g. a heated beverage, very noticeable sediments occur. Under the circumstances, the Singer, et al fat replacer particles cannot be effectively used in food compositions which are intended to be given significant higher temperature heat treatments, such as ultra high temperature retorting and high temperature-short time pasteurization, and to a lesser extent with low temperature-long time pasteurization, and, thus, the use of those fat replacer particles is severely limited for general food use.

It would, of course, be of considerable advantage to the art to provide fat replacer particles, similar to those of the Singer, et al particles, and which exhibit the required organoleptic properties, but which are not so heat labile and which do not, concomitantly, exhibit such instability. It would further be of advantage to the art to provide such fat replacer particles which can be manufactured in a more efficient, inexpensive and straight forward method than the high shear method required for manufacture of the Singer, et al particles. It would be a further advantage to the art to provide similar fat replacer particles where those particles could be processed according to usual dairy processes, e.g. continuous high temperature-short time (HTST) pasteurization as opposed to batch low temperature-long time (LTLT) pasteurization, without degradation of the organoleptic or stability properties. It would be a further advantage to practice such an improved process with generally available whey protein, rather than the special whey protein of the Singer, et al patent, and to provide a spray-dried form of the fat replacers. Further, it would be of advantage to provide such fat replacers which are easy to rehydrate without high shear to organoleptic sizes of particles.

SUMMARY OF THE INVENTION

The present invention is based on several primary discoveries and several subsidiary discoveries. As a first primary discovery, it was found that the small denatured organoleptic particles could be prevented from aggregating into the large non-organoleptic fused aggregates by means other than the rather energy and capital equipment intensive high shear mechanism, described by the Singer, et al patent.

As a second primary discovery, it was found that such aggregation of the smaller organoleptic particles to the larger non-organoleptic fused aggregates could be substantially prevented when the particles are co-formed agglomerates of at least partially denatured whey protein and desolubilized casein. Even with low agitation, these agglomerates may have volume mean particle diameters of about 1.0 to about 20 microns, and generally about 3.0 to about 15 microns, although other sizes may be easily prepared.

While such particle sizes may be too large to provide the desired organoleptic properties described by the Singer, et al patent, as a third primary discovery, it was found that the present co-formed agglomerates of at least partially denatured whey protein and desolubilized casein are relatively loosely formed and can be easily broken into the smaller, more organoleptically-efficient particle sizes of less than 3 microns, e.g. 0.5 to 3 microns or 1 to 2.5 microns, with only usual dairy processing, e.g. homogenization, as opposed to the large fused aggregates which can be formed in the Singer, et al process without the high shear during formation and which cannot be broken to the organoleptic sizes using similar processing.

It was further found in this regard that the co-formed whey protein and desolubilized casein agglomerates were protected from further aggregation during subsequent heating and, therefore, are not heat labile, as are the particles of the Singer, et al patent. The desolubilized casein so protects the present protein particles that any aggregation which takes place during formation or subsequent heating of the agglomerates is only a loose aggregation and can be easily broken.

As a subsidiary discovery in the foregoing regard, it was found that the casein containing agglomerates could be spray dried and subsequently rehydrated without forming fused and hard to disrupt particles as a result of the spray drying process.

As a subsidiary discovery, it was found that the casein can protect the present protein agglomerates even when the desolubilized casein in the co-formed agglomerates is over a wide ratio of whey protein to casein protein. Hence, great flexibility is provided in the composition of the co-formed agglomerates, which flexibility allows the use of the present fat replacer particles in a wide variety of food compositions.

As a further subsidiary discovery in this regard, it was found that a solution of whey and casein having a ratio of whey protein to casein (on a protein to protein basis) of about 4:1 to 1:2 provides very good properties to the present agglomerates for a wide variety of food compositions, including food compositions which are intended to be heated. Preferably, these ratios are, however, about 2:1 to 2:3, and about 1:1 is most preferred.

Further, in the above regards, the preferred ratio of whey protein to casein in the solution will give preferred ratios of denatured whey protein to desolubilized casein (on a protein to protein basis) in the agglomerates formed from that solution, i.e. 4:1 to 3:2, although acceptable agglomerates are provided when the ratio in the agglomerates is as broad as 9:1 to 1:2. The most preferred ratio in the agglomerates is about 7:3.

As a further subsidiary discovery, it was found that the presence of phosphate in the so co-formed agglomerates further decreases the strength of the so-formed agglomerates, and, hence, further increases the ease of disrupting the agglomerates so as to produce particles in the organoleptic size range of the Singer, et al patent. The phosphate also improves the heat stability of the particles.

As a further subsidiary discovery, it was found that the presence of divalent cations, especially calcium, increases the ease of disrupting those agglomerates into desired organoleptic particle sizes. This is especially true when the calcium is used in combination with the phosphate in the co-formed agglomerates. The cation also decreases the size of the agglomerates.

As a further subsidiary discovery, it was found that emulsifiers will even further decrease the strength of any such co-formed agglomerates and, again, increase the ease of disrupting such co-formed agglomerates.

As a further primary discovery, it was found that the present co-formed agglomerates could be easily produced by simple non-critical methods, which entail, basically, providing an aqueous mixture of the whey protein and casein, agitating the mixture so as to disperse the ingredients, adjusting the pH to about 3.0 to 6.6, and heating the mixture sufficiently to at least partially denature the whey protein and desolubilize, at least a portion of, the casein. Thereafter, the mixture is cooled to below the denaturing and, hence, agglomerate forming, temperature and the co-formed agglomerates are recovered. No particular high shear or other precautions are required in this process. Hence, no specialized equipment or high energy, as required in the process of the Singer, et al patent, is necessary. Temperatures for the process are not particularly critical, and no special precautions are required for further processing, e.g. further heating.

Thus, very briefly stated, the present invention provides a water-dispersible, heat-stable fat replacer for foods. The fat replacer comprises co-formed agglomerates of at least partially denatured whey protein and desolubilized casein, where the mean particle size of the agglomerates is about 1 micron to about 20 microns. The protein to protein ratio of the denatured whey protein to desolubilized casein in the agglomerates is about 9:1 to 1:2, and these agglomerates are formed from a solution of whey protein and casein with a whey protein to casein ratio of about 4:1 to 1:2, on a protein to protein basis. When the agglomerates are not in organoleptic particle sizes, these agglomerates can be easily broken to the organoleptic particle size ranges, either when placed in a food composition or before doing so by simple mechanical means, such as a homogenizer.

The invention also provides a method for producing the co-formed agglomerates, comprising preparing an aqueous mixture of whey protein and casein, with a pH of about 3.0 to 6.6, heating that mixture to a temperature sufficient to at least partially denature the whey protein and desolubilize, at least a portion of, the casein, and, thereafter, cooling the mixture to a temperature below the whey protein denaturing temperature and below the agglomerization temperature. This produces the co-formed agglomerates, which may then be recovered.

BRIEF DESCRIPTION OF THE DRAWINGS

FIGS. 1 through 18 are graphical representations of the comparison tests, reported in Examples 1 through 7, showing differences in the present agglomerates as well as comparisons with SIMPLESSE 100D, a commercially available embodiment of the Singer, et al patent.

DETAILED DESCRIPTION OF PREFERRED EMBODIMENTS

Figure 1:
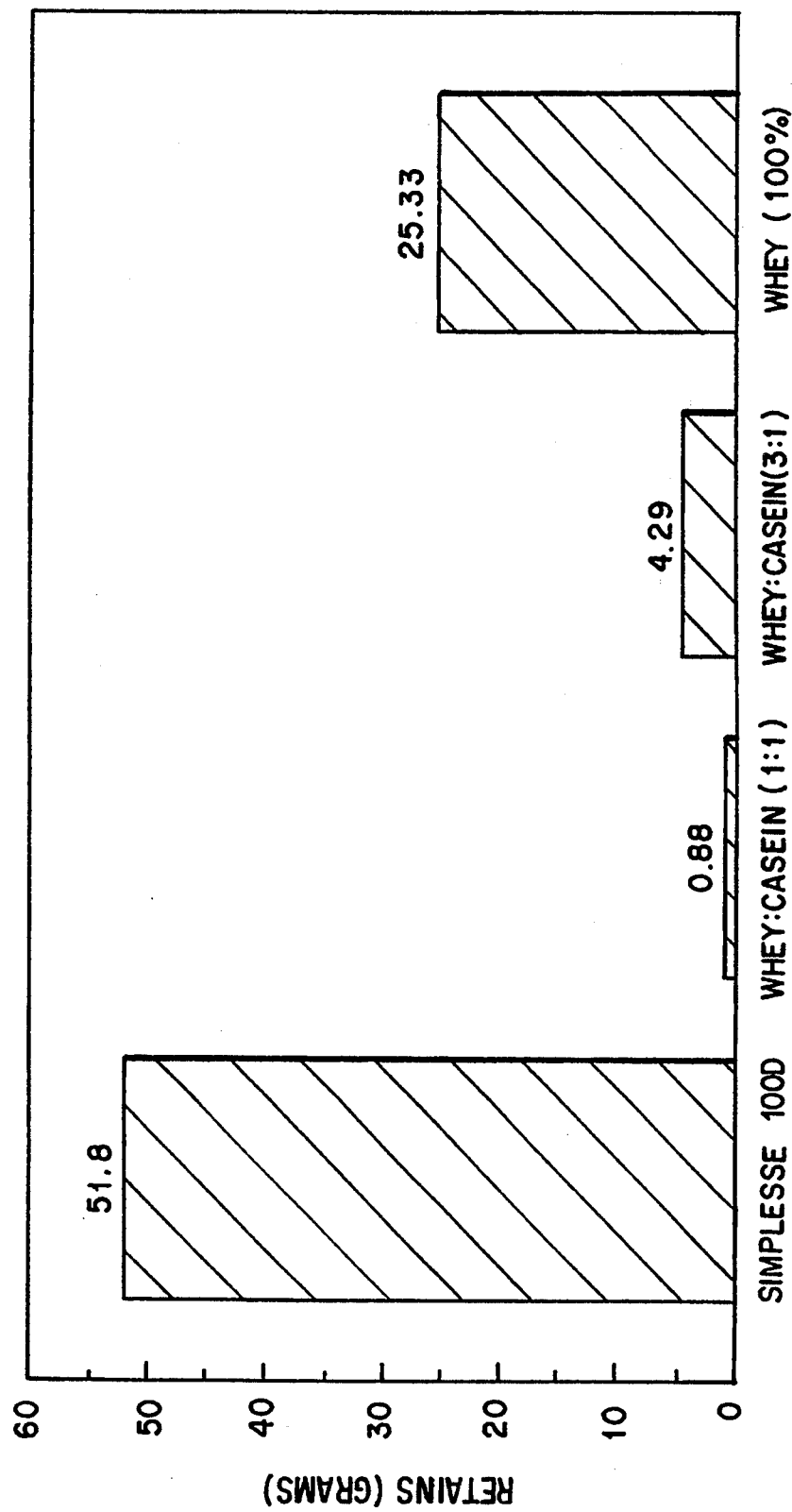

While not being bound by theory, it is believed that the novel functionality of the present agglomerates is a result of the following physical/chemical interactions.

As noted in the Singer, et al patent, the pseudo-emulsion character of whey protein particles is optimumly manifest when the heat denatured macrocolloidal particles of whey protein range in diameter from about 0.1 to about 2.0 microns. Undenatured whey protein particles have diameters from about 0.002 micron to about 0.007 micron, and the mean aggregate size of conventionally heat denatured whey protein particles is about 15 to 200 microns, more usually about 20 to 175 microns. However, during the denaturing process, the original shape of the protein is lost, i.e. the proteins are believed to uncoil into somewhat random configurations. As denaturization proceeds, the proteins take up new configurations, such that an intermediate form of the protein is produced and then, finally, the aggregated, tightly bound together, large particles are produced. In the Singer, et al patent, these large, tightly-bound, aggregated particles are largely prevented from being produced by the very high shear used during the denaturing process.

As opposed to the particles of Singer, et al, the present co-formed agglomerates need not be produced under high shear, because the desolubilized casein substantially prevents formation of the tight bonds of the aggregates, and, instead, produces loosely bound agglomerates. This action of the desolubilized casein is believed to be a result of the following, although, very specifically, the applicant is not bound by the following theory. Thus, as the temperature rises in an aqueous solution of whey protein, with denaturing conditions, the denaturization takes place in a two-step manner. Conformational changes in the protein take place. Secondary and tertiary structures are broken, and electrostatic bonds and even covalent bonds are broken and new ones reformed as the temperature rises. Thus, the protein unfolds and exposes theretofore unexposed reactive groups and regions such as hydrophobic regions, charged groups or free sulphydryl groups. Of these different bonds, only the hydrophobic region interaction shows increased strength with rising temperatures. However, at higher temperatures, they, too, begin to break down.

In the second stage of denaturization, these exposed groups and regions interact with other groups and regions, and these interactions may be either inter-or intra-molecular in nature. The large, tightly-bound, aggregates are thus formed. In order to produce the organoleptic sized particles, it is necessary to limit the growth of the particle size during this second stage of the denaturization process, as has been pointed out by Singer, et al. However, as opposed to Singer, et al, who rely upon high shear to limit such particle size growth, with the use of the present desolubilized casein, the reactive groups and regions, especially free sulphydryl groups, are deactivated, especially at low pHs, and growth and tight bonding are limited. In a sense, it could be said that these reactive groups and regions are buried within the interior of the microprotein (coagulum), particularly within the more heat stable hydrophobic areas.

It is also believed that during the denaturing process, the free sulphydryl groups are protonated by a proton—hydrogen—at low pH and high hydrogen ion concentration, which prevents the formation of excessive inter-molecular bonds of the type which are extremely difficult to break and which will lead to essentially unbreakable and unacceptably large mean diameters of the resulting aggregates. The lower pH (below neutrality) protonates the very reactive thiol groups and renders them unreactive. This greatly reduces the amount of new covalent bonds formed. New covalent bonds formed during protein denaturation are usually a result of disulfide-thiol groups, and such covalent bonds are extremely difficult to disrupt with high shear.

It is, however, still important to stabilize this resulting conformational change in the whey protein. Thus, the presence of a divalent cation in the aqueous mixture undergoing denaturization will promote conformational stability. It is believed that the addition of a divalent cation, especially an alkaline metal or alkaline earth cation, and particularly calcium, causes the present unfolded denatured whey protein to somewhat collapse. It appears that the denatured whey protein is so collapsed that the reactive groups and regions are at least partially blocked or "buried" within hydrophobic regions of higher degrees of thermal stability. These regions result from increased protein/protein interactions within the individual microagglomerates.

When the aqueous solution to be denatured also contains phosphate or a source of phosphate, the phosphate, apparently, complexes with the protein to control the density and rigidity of the agglomerates and yields a softer agglomerate. This enhances the ability of the agglomerate to be more easily broken during subsequent processing, e.g. homogenization.

Food-grade emulsifiers in the aqueous mixture to be denatured, apparently, serve two different functions. The hydrophobic portion of the emulsifier serves as a nucleating agent for exposed hydrophobic regions of the protein. In addition, the emulsifiers act to stabilize the resulting product by increasing the surface hydrophilicity. While small agglomerates are obtainable without emulsifiers, the thermal stability is not as good.

While all of the above contribute to the ability to produce the present novel agglomerates, the most important component for achieving this result is the casein. Experiments have shown that when the present agglomerates made with all of the components described above, including casein, are homogenized to desired sizes, if necessary, and then dried, those agglomerates can be readily dispersed to those same pre-dried particle sizes after only a few minutes of hydration and with minimal agitation, e.g. with a conventional laboratory magnetic stirrer. However, experiments have also shown that when the present agglomerates are made with all of the components described above, except the casein, and subsequently dried, the product cannot be redispersed in water sufficiently to provide organoleptic acceptable particle sizes or provide a gravitational stable product, unless high shear is used to redisperse the product.

It is believed that this above-described defect in the present, but non-casein containing agglomerates, may be due to the fact that during dehydration, e.g. drying, protein particles come closer and closer together, overcoming the long range electrostatic repulsions between microcoagulates and allowing short range, but very powerful hydrophobic attractions to take place. However, with the present co-formed agglomerates having the desolubilized casein, the microcoagulates, apparently, are prevented from formation of these very hard to disperse aggregates.

It is believed that the desolubilized casein is associated with the reforming and denaturing protein particles and causes a soft agglomeration thereof. This soft agglomeration of particles remains in a state where the agglomerates are easy to break. Thus, in this sense, the present agglomerates could be considered to be agglomerates which are softened by the desolubilized casein.

If the present agglomerates are made with all of the components described above, but without casein, the agglomerates also exhibit very poor thermal stability. It is believed that the present high thermal stability is a result of the same interactions discussed above in connection with the use of casein. This thermal stability is also enhanced by the use of the low pH during denaturization, the presence of a phosphate and calcium, as well as emulsifiers. Deletion of any of these results in less thermal stability. However, acceptable thermal stability cannot be achieved with the deletion of casein.

The very different functionality of the present agglomerates, as opposed to the particles of the Singer, et al patent, can be more fully appreciated by the ability to produce the present agglomerates with only nominal agitation. As the Singer, et al patent points out, the particles of that patent can be produced only with high shear during denaturization to prevent the formation of non-organoleptic size fused aggregates of the particles. There are, of course, a number of different methods for keeping reactive or "sticky" proteins apart in order to produce stable, non-aggregated microcoagulated protein dispersions. For example, very low protein concentrations (less than one percent) may be heated to denaturing temperatures without forming large aggregates. This is accomplished by the relatively large distances separating the protein molecules and, consequently, lower numbers of protein/protein collisions per second. However, such low concentrations are not practical from a commercial point of view.

The Singer, et al patent teaches the use of well known aggregate blocking agents, in addition to high shear, such as certain emulsifiers and stabilizers. Such emulsifiers and stabilizers allow higher concentrations of protein solutions, and yet lower the number of protein/protein collisions per second. However, the Singer, et al patent teaches that these aggregate blocking agents are not effective, in themselves, and can only be used in combination with the high shear, e.g. about 500,000 $min^{-1}$, to eliminate or substantially reduce the large non-organoleptic size fused aggregates. In essence, the Singer, et al patent applies high energies to keep the reactive molecules from sticking to one another. To achieve this high energy, very special apparatus is required, with high energy inputs.

As opposed to all of this, quite acceptable size ranges of the present particles can be produced with relatively low shear, i e 50,000 to 75,000 $min^{-1}$, but more usually 45,000 $min^{-1}$ or less is more than sufficient. Further, this process results in the formation of loosely-bound agglomerates. Even with this very low agitation, the present process can result in agglomerates of about 20 microns mean diameter or less.

While the Singer, et al patent points out that subsequent to denaturization and cooling, further agitation, e.g. homogenization, cannot disrupt the tightly-bound aggregates of the Singer, et al process, the same is not true for the present agglomerates. Thus, the loosely-bound present agglomerates may be subjected to conventional homogenization, e.g. after cooling and neutralizing, and those loosely-bound agglomerates are easily broken into organoleptic sizes. Even with moderate agitation, those loosely-bound agglomerates may have mean diameters, by volume, of about 7 microns or less, and with usual and conventional agitation, e.g. conventional homogenization, those agglomerates will be quickly broken to organoleptic-size agglomerates or particles of 3 microns or less, e.g. about 1.0 or about 2.0 or about 5.0 to about 7 microns, with at least 95 volume percent of the particles being within these size ranges. In fact, the present low shear rates provide another advantage. The present low shear, as described above, during denaturization, results in a slightly larger agglomerate than that of Singer, et al but one which is thermodynamically more stable.

Furthermore, the Singer, et al patent teaches that whey protein of very specific compositions, i.e. that of limited non-protein nitrogen (NPN), is essential to form the desired water-dispersible particles. Otherwise, those particles "stick" to one another on spray drying and are extremely hard to disperse. The present invention, on the other hand, may use normal compositions of whey with significantly higher levels of NPN with no adverse affects.

Thus, in summary, while the Singer, et al patent requires high shear to keep exposed reactive sites from reacting during denaturization, these active sites are, nonetheless, available for reaction during subsequent thermal processes, e.g. spray drying, heating food compositions, etc., which will then cause substantial aggregation. As opposed to this, the present invention causes the reactive sites to interact, particularly at low pHs, and with the present casein, low agitation is all that is required and desirable to, ultimately, produce organoleptic-size particles, which will not substantially aggregate, even during subsequent usual thermal processes.

The present agglomerates and/or resulting particles impart a cream-like consistency to water-based systems and, in reduced fat baked goods, gives rise to more tender products with a melt-in-the-mouth characteristic similar to full fat counterparts. The present agglomerates, when used with other commercial fat replacers, such as carbohydrates and emulsifier-based systems, reduce the well known undesirable characteristics of gumminess and cohesiveness associated with those low fat bakery systems.

Turning now to the process for producing the present agglomerates, the co-formed agglomerates are produced by preparing an aqueous mixture of whey protein and casein, from which a solution is formed. The ratio of whey protein to casein in the mixture is not narrowly critical, since the only important factor is that of providing sufficient casein to maintain the soft agglomerates. Any casein which remains in the aqueous mixture beyond that associated with the agglomerates is simply excess protein. For some food formulations, the additional protein is desirable, and, hence, the excess is not only acceptable, but useful in the ultimate food composition. However, usually, the ratio of whey protein to casein (on a protein to protein basis) in the solution will be up to 4:1 and as low as 1:2, and substantial excesses of casein will not be used, since excess casein does dilute the functional agglomerates, and, hence, lowers the overall functionality thereof. Thus, for most purposes, excess casein is not desired, and the above ratios of whey protein to casein (on a protein to protein basis) in the solution will be used, especially ratios between 2:1 and 2:3, and more usually about 1:1.

The amount of whey protein and casein in the aqueous mixture for denaturization is not narrowly critical. However, below a total solids content of about 5% or 10%, the economics of the process become important. At solid contents above about 60%, the aqueous solution becomes too viscous to conveniently handle and may effect more protein to protein interaction than desired. Accordingly, the protein solids content of the aqueous mixture (based on the solids content of casein and whey protein) should be between about 5% and 27%, more usually between about 9% and 23%, and more ideally between about 13% and 18%.

The whey protein, itself, may be in the form of whey protein isolate or whey protein concentrate or whey itself, either liquid whey or dried whey. However, because whey itself contains considerable amounts of other materials not relevant to the agglomerates, and which may induce unwanted flavors in foods, e.g. especially considerable amounts of lactose, it is preferred that the whey protein is in the form of whey protein isolate or whey protein concentrate, although other forms of whey are quite acceptable and may be economically preferable. When whey protein concentrate is used, the concentrate should have about 20% to 80% whey protein therein, especially about 35% to 75% of whey protein, on a solids basis. Actually, there are no restrictions on the composition of the whey protein concentrate other than it be manufactured according to good manufacturing practice, be free from significant microbial contamination, extraneous matter, etc. Otherwise, a whey protein concentrate of usual commercial composition will suffice. Typically, a commercial whey protein concentrate will include about 2% to 3% non-protein nitrogen and about 15% to 55% lactose.

The casein may vary widely depending on the specific application, and acid casein or rennet casein may be used. However, more usually acid casein or a caseinate will be used, e.g. sodium caseinate, potassium caseinate, magnesium caseinate, and calcium caseinate. In many circumstances, it is preferred that the casein is at least in part calcium caseinate, e.g. a 50/50 mixture of calcium and sodium caseinate, since the calcium caseinate will provide the divalent cations, for the reasons discussed above, and no further addition of cations to the aqueous mixture is necessary, especially when the calcium caseinate is in a ratio to the whey protein, as described above. Alternatively, the whey protein and casein may be provided, at least in part, by a milk fraction. For example, non-fat dry milk solids has both casein and whey protein therein and may be, at least in part, used as a source of these two. Of course, additions of casein or whey protein will be required to reach the ratios of whey protein to casein, described above. Alternatively, skim milk or ultrafiltration skim milk or freeze-concentrated skim milk may be used, at least in part, to provide the casein and whey protein.

The aqueous mixture must be in a condition to promote denaturization. Denaturization is achieved by lowering the pH, e.g. to 3.0 to 6.6, and heating the aqueous mixture. Denaturing results in insoluble denatured whey protein and, most conveniently, in the prior art that denaturing was achieved by heating the protein to higher temperatures while at about, or more usually slightly above, the protein isoelectric point (a pH of about 4.6 to 6.0 and more ideally between about 5.0 and 5.5). Also, as pointed out in the Singer, et al patent, denaturization, in the context of protein chemistry, covers a range of changes in the molecular structure of the proteins. For example, by heating a protein solution beyond a point, which is characteristic for each protein, and/or by exposing it to acids, alkalines or various detergents, denaturization can occur. An irreversibly denatured protein has a reduced solubility relative to its undenatured or native state, and it cannot be crystallized. While denaturization is usually irreversible, there are some instances, depending on the protein and the treatment thereof, which are at least partially reversible.

The present denaturization must proceed to the point where the whey protein is at least partially in a denatured state. That state reduces the solubility of the whey protein and causes the hydrophobic agglomeration, as discussed above. However, especially at lower pHs, e.g. a pH of 3 to 6.6, the sulphydryl containing amino acids tend to remain protonated and unreactive, protecting them from disulfide/thiol interchange, as discussed above.

Such a pH can be achieved by the addition of a food-grade acid to the aqueous mixture. While any food-grade acid may be used for that purpose, it is preferred that the acid be one or more of acetic, phosphoric, hydrochloric, sulfuric, citric, lactic and hypochloric acid. It is most preferred that the acid be a phosphate-producing acid to provide phosphate to the mixture, such as meta-, ortho-, poly- or pyro-phosphoric acid, since the acidification for a pH control using such acids automatically places the desired phosphate in the co-formed agglomerates, as explained above, and produces superior agglomerates. When phosphoric acid is used for adjusting the pH, about 5% to 10% phosphoric acid by weight of protein in the mixture will be suitable for adjusting the pH. This amount will produce a pH of about 3.0 to 5.5 or 5.9, which is quite acceptable for the process. However, the phosphate need not be added by the acid, but can be added as a compound, e.g. oxide, etc., such as an ortho-, meta-, poly- and pyro-phosphate, e.g. a salt of an alkali earth metal such as sodium, potassium, calcium, and aluminum.

As explained above, it is very desirable to add a food-grade emulsifier to the aqueous mixture. The amount thereof is not narrowly critical, and very small amounts are quite effective. Thus, for example, the amount of emulsifier may be about 0.005% to about 1%, although excesses of this amount of emulsifier may be used if desired. However, excess emulsifiers may interfere with rehydration of a spray-dried product. While any food-grade emulsifier may be used, e.g. ionic and non-ionic emulsifiers, certain emulsifiers are preferred, and especially emulsifiers which contain a $C_{12}$ to $C_{18}$ carbon chain such as a stearine derivative. Also, lactylates and oleates provide especially good results, particularly sodium stearoyl-2-lactylate and/or polyglycerol mono-oleate. Other useful emulsifiers are polyglycerol mono-oleate, distilled monoglycerides, lecithin, glycerol monostearate, diacetyl tartaric acid esters of monoglycerides, sodium or calcium stearoyl-2-lactylate, propylene glycol monolaurate, propylene glycol monostearate, sorbitan monostearate, polyoxyethylene (20) sorbitan monostearate, polyoxyethylene (20) sorbitan tristearate, and polyoxyethylene (20) sorbitan mono-oleate.

As noted above, the phosphate, calcium and emulsifier all aid in providing the present loosely-bound agglomerates, and for this reason, it is preferred that the aqueous mixture contain all of a phosphate compound or phosphate-producing acid, a source of calcium and a food-grade emulsifier.

The aqueous mixture is then heated to a temperature sufficient to fully dissolve the ingredients and subsequently at least partially denature the whey protein. The extent to which the whey protein is denatured depends upon the denaturing conditions, e.g. pH, temperature and time of heating and the particular form of whey protein. Undenatured whey and casein proteins remain in solution in the aqueous mixture and, therefore, do not constitute a problem, especially when the denatured agglomerates are separated from the aqueous mixture supernate, e.g. by filtration, etc. However, for economic reasons, the denaturing of the whey protein should be sufficient that the whey protein is at least 20% denatured or at least 30% denatured, and more usually at least about 40% denatured, and up to nearly 70% or more denatured. The temperature for such denaturing is not narrowly critical, so long as the above results are obtained, but, generally speaking, the aqueous mixture (and resulting solution) will be heated to a temperature of at least about 75° C. and up to 100° C. or more. The time at these temperatures is also not narrowly critical, and may range from as little as one-half minute to as long as 40 minutes or longer, depending upon the particular apparatus being used and the desired extent of denaturing. However, for conventional dairy apparatus, such as vat pasteurizers and the like, times between about 1 minute and 20 minutes are quite satisfactory, e.g. 10 minutes at 175° F.

During the heating step, the heated mixture is agitated. This is, of course, not the high shear required by the Singer, et al patent, but only sufficient agitation for dispersal, solution and heat transfer purposes. The agitation should be sufficient that the mixture and resulting solution are fairly homogenous of the ingredients and that the heating, preferably in the form of direct steam injection, is throughout the bulk solution. Culinary steam injection is the preferred means of heating. This is opposed to the Singer, et al patent where considerable effort is undertaken to remove any vapor or gases from the heated mixture, for the reasons explained in the Singer, et al patent. The preferred steam not only provides heating effect for the denaturization step, but the steam is also intimately mixed with the protein solution. The temperature of the steam at atmospheric pressure will not exceed 212° F., and more that 80% of the heating effect of the steam is through its lost latent heat by condensing. However, when a jacketed vessel is used for heating purposes, the heated jacket is typically at much higher temperatures. For a jacket with saturated steam at about 15 psig, the temperature will be about 248° F. The mixture close to the jacket will then be at a high temperature and may form undesired fused agglomerates, unless greater agitation is used or unless the temperature difference between the jacket and the mixture is quite low, which would significantly extend the heating time required. The present agitation may be by any of the conventional means in the art, e.g. stirrers, pumps, homogenizers and the like.

After the heating and agitating, the mixture is cooled to a temperature below the whey protein denaturing temperature, and, hence, the agglomerization temperature, in order to cease denaturization and agglomerate production. In the present process, that cool temperature will be below at least about 75° C., e.g. below about 60° C. and especially below 55° C. (further agglomerization will essentially cease at about that temperature), but more preferably the mixture is cooled to a cool temperature of below 50° C.

After this cooling, the co-formed agglomerates may then be recovered. The recovery is by any conventional and convenient means, such as by filtration, centrifugation, decanting, ultrafiltration and spray drying. If the agglomerates are to remain in, or be placed in, an aqueous suspension for use, in a food, then recovery by filtration, centrifugation, decanting and especially ultrafiltration are, of course, preferred. Indeed, the liquid suspension, as formed in the process, may be directly used in some foods. However, if the agglomerates are to be used in a dry form in a food mixture, then freeze drying or spray drying may be used. As opposed to the Singer, et al particles, such drying does not adversely effect the present particles. Spray drying conditions are not narrowly critical, in view of the heat-stable properties of the present agglomerates, and conventional spray drying conditions, such as 150° C. to 200° C. inlet air and 65° C. to 85° C., typically 70° C., outlet air, are quite satisfactory.

Spray drying, it is believed, involves yet a further function which increases the dispersibility of the present agglomerates. Thus, if agglomerates in a slurry of the mixture (or solution) from which they are formed are spray dried, that mixture will, automatically, contain remaining natural (not desolubilized) casein. In spray drying, that natural casein will, of course, remain in the dried agglomerates, and, it is believed, forms into a thin film between particles of the agglomerates. The natural casein is, of course, quite soluble, and when the spray dried agglomerates are redispersed in a water-containing medium, that casein quickly dissolves and aids in redispersing the particles of the agglomerates. This function of the native casein also takes place in regard to separation of agglomerates from each other and redispersal of the agglomerates.

As noted above, the ratio of denatured whey protein to desolubilized casein in the particles themselves can vary considerably from the ratio thereof in the solution from which the agglomerates are formed. Thus, in the agglomerates, that ratio, on a protein to protein basis, can vary as much as 9:1 to 1:2, but more often is about 4:1 to 3:2 and more usually about 7:3. The ratio in the agglomerates varies not only with processing conditions, e.g. temperature, time, pH, etc., but with the ratio in the solution from which they are formed.

Depending upon the amount of agitation used during the denaturing step, the mean particle size of the co-formed agglomerates can vary. However, as noted above, the size of the agglomerates is essentially immaterial, since the loosely-formed agglomerates are easily broken into organoleptic size particles. With only minimum agitation during denaturization, i.e. for ingredient dispersal purposes, the mean agglomerate size (diameter) can be from 20 to 75 microns. However, such larger agglomerate sizes requires that some additional and substantial subsequent agitation be performed to reduce those larger sizes to organoleptic sizes, and it is, therefore, more convenient to supply sufficient agitation, during the denaturing step, such that the mean size of the agglomerates is about 30 microns or less, especially about 20 microns or less. Indeed, with only conventional agitators (stirrers), the mean size of the agglomerates will be under 20 microns, e.g. about 15 microns or less. This is the most convenient form of the process, since it minimizes further agitation for producing organoleptic sizes of the agglomerates. In addition, when the agglomerate mean size is below 20 microns, especially below 15 microns, the agglomerates begin to become gravitationally stable, even though they may not be of optimum organoleptic size. When the mean agglomerate size is less than about 7 microns, especially less than about 2.5 to 3 microns, the agglomerates can be incorporated into a food composition and will remain gravitationally stable in that food composition. Thus, for that reason, it is preferred that the agitation or some suitable disruptive treatment during or immediately after denaturization, e.g. homogenization, be sufficient to reduce the particle size of the agglomerates to about 7 microns or less, especially a mean size of 1 to 3 microns or less, particularly such that the volume percent of particles about 7 microns or more is less that 5%.

In many food compositions, further agitation of the composition is required. That agitation may be sufficient to further reduce the agglomerates to organoleptic particle sizes, when the composition is in a final form. For example, a dry dairy solids composition can be prepared for reconstitution in a fluid mixture for use in a frozen desert. Such dairy solids usually require substantial mixing shear, e.g. homogenization. With the present loose agglomerates, such shear will break the loose agglomerates to more desired organoleptic sizes, especially when substantial homogenization is used, which is normal for such food compositions.

From the above, it can be seen that the present process does not require any specialized processing equipment, as opposed to the process of the Singer, et al patent. Conventional dairy processors, such as simple vats and stirrers, is all that is required. This provides a very decided advantage to the present invention in that the processing is considerably simplified, is non-critical, and does not require high energy inputs or costly capital equipment.

As noted above, the product which results from the above-described process is a water-dispersible and heat-stable fat replacer for foods. The fat replacer is, essentially, composed of co-formed agglomerates of at least partially denatured whey protein and, in part, desolubilized casein. In this latter regard, and as briefly explained above, the term "desolubilized" has a special meaning, as used in this specification and claims. Thus, casein is normally soluble in aqueous mixtures, but, as noted above, during denaturization the casein interacts with the whey protein to deactivate active sites and form soft agglomerates of the reformed and denatured whey protein. That casein is no longer soluble in that it sediments with the denatured whey protein only at about 20,000 times gravity, which is most unlike undenatured casein. Thus, in that sense, it is "desolubilized". Thus, the definition of desolubilized casein, for present purposes of the specification and claims, means that the casein is co-agglomerated with the whey protein particles to the extent that it is not only less soluble than the excess casein which may be in the aqueous mixture or on or in the resulting agglomerates, as explained above, but is associated with the reformed (denatured) whey protein in soft agglomerates. This is, however, not intended to mean that the casein associated with the whey protein cannot be resolubilized under any conditions, but is intended only to mean that it is desolubilized when associated with the whey protein, as compared to the casein which is not desolubilized. Of course, any excess casein will not normally be in the co-formed agglomerates, other than to the extent that excess casein may be occluded in the denatured protein particles, as explained above.

Further, as discussed above, the agglomerates, normally, will be in the range of about 1.0 micron to about 15 or 20 microns mean diameter, although this size range may be easily reduced, if desired. Thus, for example, after cooling, the denatured aqueous mixture is preferably neutralized, and that mixture can be passed through a conventional dairy homogenizer. A variety of homogenization pressures, stages and number of passes may be used, depending upon the mean size of agglomerates desired. For example, in a two stage homogenizer, with the second stage as 500 psig and the first stage at 2000 psig (total 2500 psig), mean particle size diameters of about 1 to 3 micron are easily attainable, but more preferably mean sizes of about 2.0 to 2.5 microns. For present purposes, especially where the present agglomerates are to be placed in a food composition which will incur further agitation as described above, a mean agglomerate size of between about 2.1 and 7 microns is quite satisfactory. This will not give any substantial "gritty" mouth feel to the composition and especially after sufficient further processing to reduce particle sizes. This will keep the agglomerates in good gravitational stability.

Depending on the intended use of the agglomerates, the aqueous mixture, either after or before cooling, preferably after cooling, can be adjusted in pH, e.g. neutralized and then, preferably, homogenized. The pH can be adjusted with conventional alkalies, such as an alkali metal and alkali earth, oxides, hydroxides, carbonates and the like, and the particular neutralizing agent is not critical. The adjusted pH can vary widely, but preferably, the pH is adjusted to a pH above the isoelectric point of the whey protein, to a pH of at least 5.9 or greater. Where the agglomerates are intended to be used in an acid food composition, the pH may be adjusted to less than neutral, or where the agglomerates are to be used in a basic food composition, the pH can be above neutral. Generally speaking, however, the pH will be adjusted to a pH value between about 6 and 8, more usually between about 6.5 and 7.5, and even more usually near neutral.

While not necessary, the agglomerates in the aqueous mixture, after denaturization and before or after cooling and before or after neutralization, may be pasteurized, preferably as a last step. Conventional pasteurization is quite acceptable in this regard, e.g. 170° F. for 15 seconds in a conventional pasteurizer or 190° F. for, e.g., 2 to 10 seconds in a high-temperature short-time pasteurizer.

While not necessary, if desired, the present agglomerates may have associated therewith optional ingredients, such as other fat replacers, e.g. carbohydrates, polyhydric alcohol gums or minerals, extenders, preservatives, colors, flavors, spices, and the like. All of this is optional and can be added as desired. Many of these can be added to the aqueous mixture, preferably after cooling, or they can be dry blended with the agglomerates when the agglomerates have been rendered in a dry state, e.g. by spray drying.

Further, some benefit can be achieved with the present agglomerates by use of some of the aggregate blocking agents described in the Singer, et al patent, although this is not necessary. For example, carrageen gum, carboxymethyl cellulose, hydroxypropylmethyl cellulose, and the like, do have some small effect on limiting the agglomerate sizes formed during the denaturization of the whey protein, and also appear to have some slight effect on reducing the degree of aggregation of the agglomerates needed to reach organoleptic sizes. These also appear to have some slight effect in limiting reaggregation of the agglomerates after homogenization by stabilizing surface properties thereof. Thus, these may be incorporated into the aqueous solution either before or after neutralization, although the use of such blocking agents is not necessary.

Since the present agglomerates may be both gravitational and heat stable, they may be used in a wide range of food compositions as fat replacers, such as beverages, soups, sauces, e.g. cheese sauces, macaroni and cheese, bread, pastry, desserts, coffee whiteners, gravies and the like, all of which food compositions are intended to be heated, either during processing or when being prepared for consumption. The present agglomerates can be also used in foods not intended to be given a high heat treatment, such as those foods useful for including the particles of the Singer, et al patent, e.g. frozen desserts, non-baked pudding compositions, ice cream, and the like.

Also, when the agglomerates are to be dried, e.g. spray dried, the aqueous suspension to be dried may have incorporated therein other ingredients, such as flow control agents (for the resulting powder) and diluents. Also, conventional reconstitution agents may be used in such mixture. Thus, diluents, such as dextrins or corn syrup, e.g. from 1% to 40%, may be used. These diluents also give some protection to the agglomerates from adherence, especially during transportation and handling, and make reconstitution more easy. Reconstitution agents, such as sodium hexametaphosphate or disodiumphosphate or trisodiumphosphate, may also be included.

For specialized food compositions, portions of the food composition may also be included. For example, when the agglomerates are intended for ingredients in a dried cheese sauce, prior to drying, cheese flavors, artificial cheese or natural cheese, may be included in the mixture for drying. Spices, salt, pepper and the like may also be included.

The invention will now be illustrated by the following examples where all percentages and parts are by weight, unless otherwise indicated, which is also true for the foregoing specification and following claims. It is to be particularly noted, however, that the examples merely illustrate the invention and are not intended to limit the invention.

EXAMPLE 1

Whey protein concentrate solids and sodium caseinate, at a ratio of 1:1, by weight on a protein to protein basis, were dispersed in water to a solids content of 30%. Sufficient phosphoric acid was added to the aqueous mixture until a pH of about 4.6 was reached. The whey protein concentrate had a protein content of about 34%, non-protein nitrogen content of about 2.5%, ash content of about 5.5%, lactose content of about 50%, and about 5% residual milk fat. About 0.1% sodium stearoyl-2-lactylate emulsifier was added thereto.

The aqueous mixture was agitated by injecting culinary saturated steam into the aqueous mixture (a culinary steam injector was used), and the aqueous mixture was also heated by a steam jacket of a conventional heated vessel to about 93° C. for about 1 minute. Steam injection was at a rate to produce temperature increase of about 4° C. to 6° C. per minute. A propeller mixer was used for agitation, and the temperature differential between the jacket and the solution was less than 5° C.

Thereafter, the mixture was cooled to below about 50° C. and the pH was adjusted to about 6.6±0.2 with potassium hydroxide. The neutralized mixture was then homogenized in a two-stage dairy homogenizer with a second stage at about 500 psig and the first stage at about 2000 psig (total 2500 psig). Two passes at these pressures through the homogenizer were used.

The homogenized product was then pasteurized at 77° C. for 15 seconds, through a plate heat exchanger, and then cooled to below 4° C. and stored at that temperature for testing.

A portion of the pasteurized mixture was spray dried in a conventional spray drier with entering temperature air at about 150° C. and exiting air at about 80° C. to produce spray dried particles.

To test water dispersibility, a spoonful of the dried powder was placed in about a liter of water and stirred with a laboratory magnetic stirrer for 5 minutes. The powder fully dispersed in the water.

To test gravitational stability, a 20% dispersion of the powder in water was prepared, as above, and the dispersion was allowed to stand, in an unagitated condition, for 30 minutes. No significant sedimentation was observed.

To test heat stability, a 10% dispersion of the powder was made in water and allowed to hydrate for 30 minutes at room temperature. 200 milliliters of the dispersion was then heated for about 2 minutes in a laboratory microwave oven at full power. The temperature of the dispersion was about 95° C. The dispersion was allowed to cool at ambient temperature for 2 hours and the sediment was recovered. The contents were passed through a sieve which retained particles sizes greater than 212 microns. The mean particle diameter of the permeate was determined. A laser diffraction analysis was used. Retentate on 212 micron screen was allowed to drain for 4 minutes before being weighed. The weight of the screen was subtracted from the weight of the screen and retentate.

As a comparison, the same 10% solution of spray dried powder was passed through the same sieve (the 10% solution had not been heat treated, as described above, and is referred to as "pre-heat" particles, as opposed to the particles which were heat treated, as described above, and are referred to as "post-heat" particles). The mean particle diameter of the permeate was likewise determined.

As a further comparison, the same procedure described above was repeated, except that the ratio of whey protein concentrate to calcium caseinate (on a protein to protein basis) dispersed in the water was 3:1, and as a further comparison, the same procedure was carried out, with the exception that the aqueous mixture contained no casein whatsoever (100% whey protein concentrate).

As a further comparison, commercially available fat replacer manufactured according to the Singer, et al patent (designated SIMPLESSE 100D) was heat treated as described above and passed through the sieve, and as a further comparison, a sample of that same material without the heat treatment was passed through the sieve (referred to, respectively, as "pre-heat" particles and as "post-heat" particles).

Retains, in grams, of all of the samples were determined on an equal gram basis supplied to the sieve. The results of this test for all of the above-noted fat replacers is shown in FIG. 1.

As can be seen from that Figure, only about 1 gram of the heat treated 1:1 whey protein/casein solution agglomerates was retained on the sieve and only about 4 grams of the heat treated 3:1 whey protein/casein solution agglomerates was retained on the sieve. However, the 100% heat treated whey protein solution agglomerates were in an amount of about 25 grams on the sieve, which shows the decided improvement achieved by the present invention using desolubilized casein in preventing large aggregates from forming during heat treatment. Most strikingly, however, the sample of heat treated SIMPLESSE 100D retained about 53 grams on the sieve, demonstrating the high heat labile condition of the fat replacer prepared according to the teachings of the Singer, et al patent, and as reported in that Singer, et al patent.

For all of the above fat replacers, the particle size growth caused by the heat treatment was shown by determining the mean diameter (in microns) for the pre-heat particles and the post-heat particles in the permeate from the 212 micron sieve, as described above.

Figure 2:
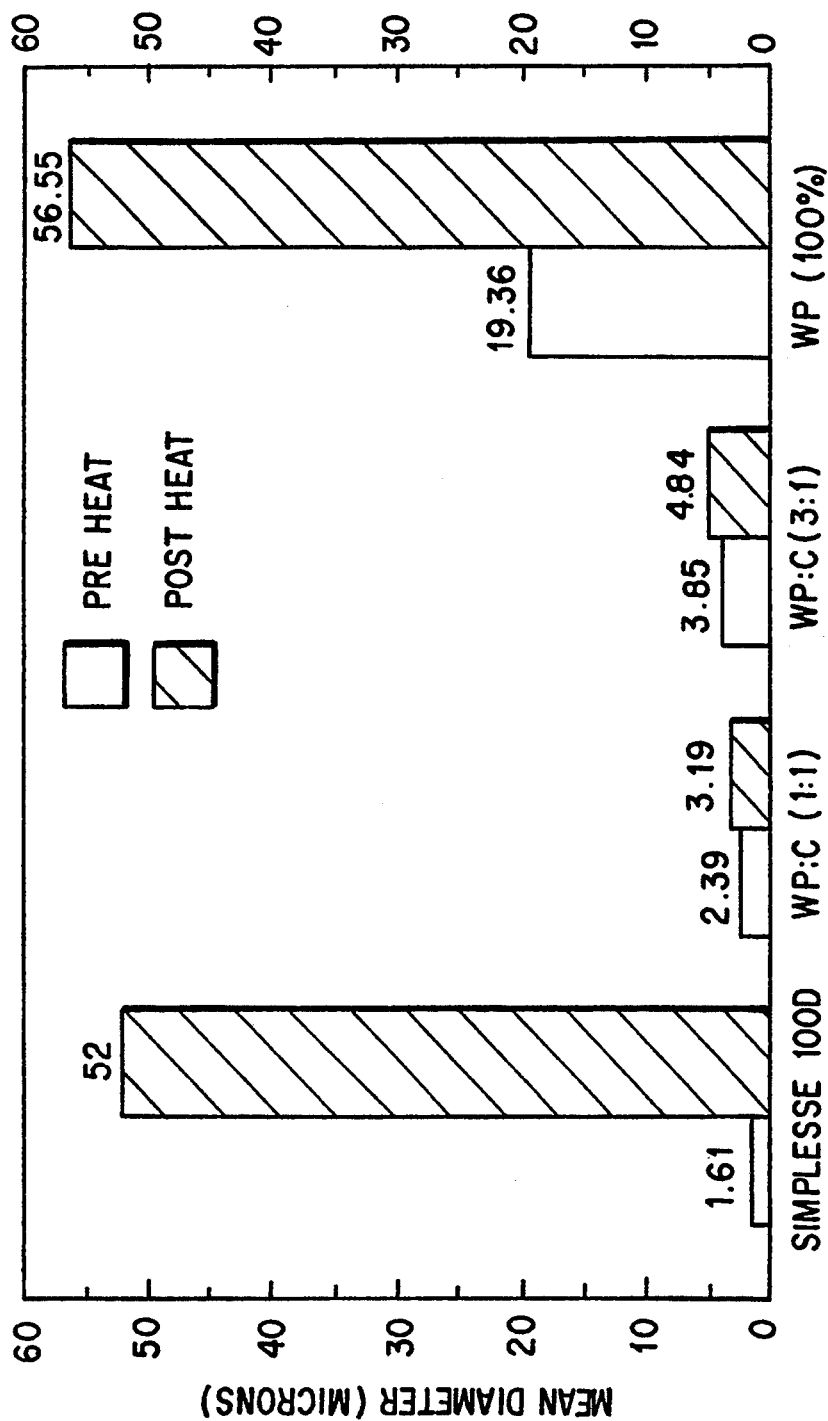

The results of this test is shown in FIG. 2. As can be seen from that Figure, 1:1 whey protein/casein solution agglomerates had only a slight increase in mean particle diameter, as did the 3:1 whey protein/casein solution agglomerates. On the other hand, the 100% whey protein solution agglomerates had a very large increase in mean diameter, changing from about 20 $\mu$m to about 55 $\mu$m. Very comparable thereto, the SIMPLESSE 100D mean diameter changed from about 1$\mu$m to about 52 $\mu$m. This, again, demonstrates the high thermal stability and lack of particle size growth with the present agglomerates, as opposed to particles not having the casein protective agent and as opposed to the particles of the Singer, et al patent.

Figure 3:
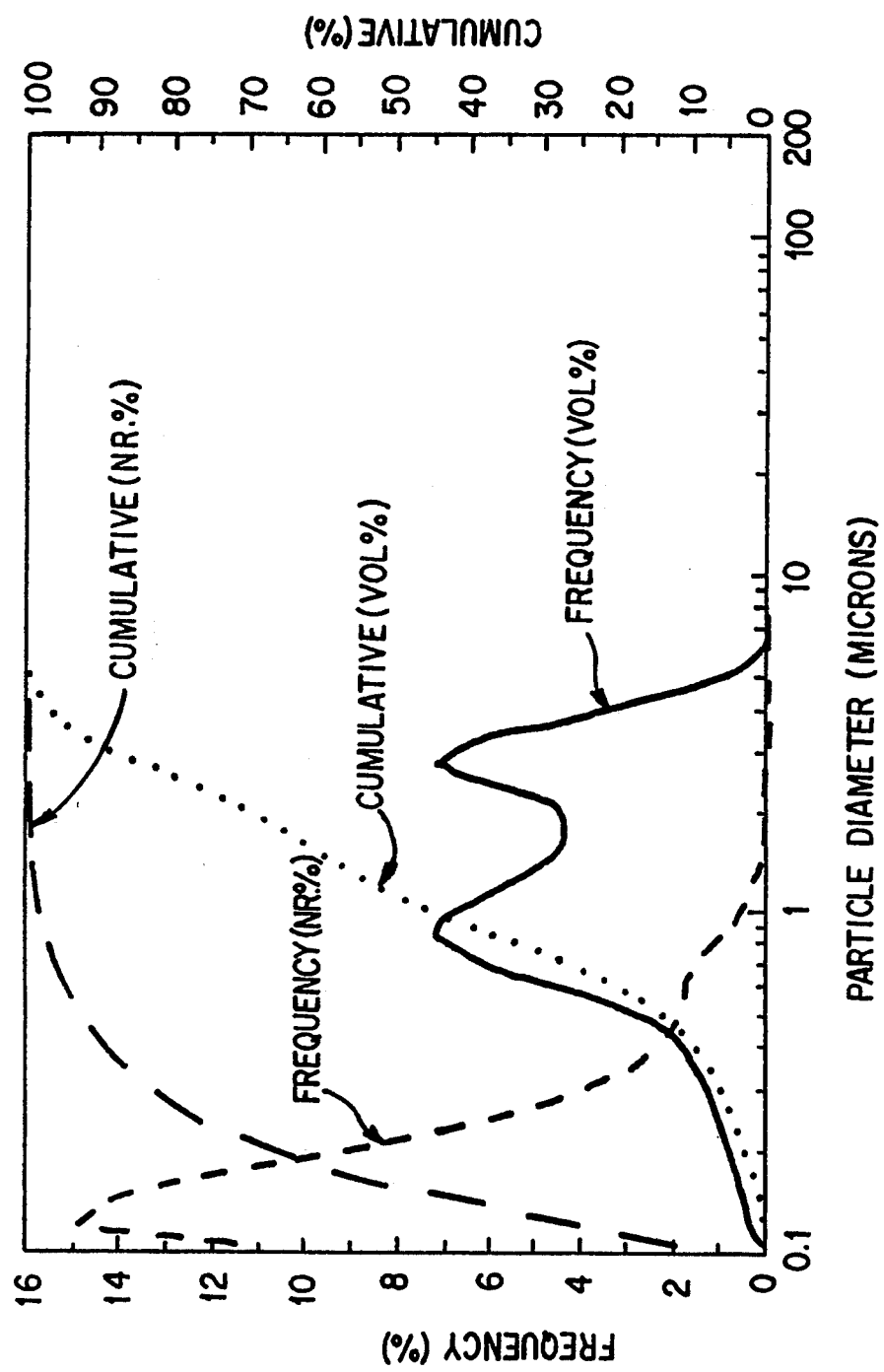
Figure 4:
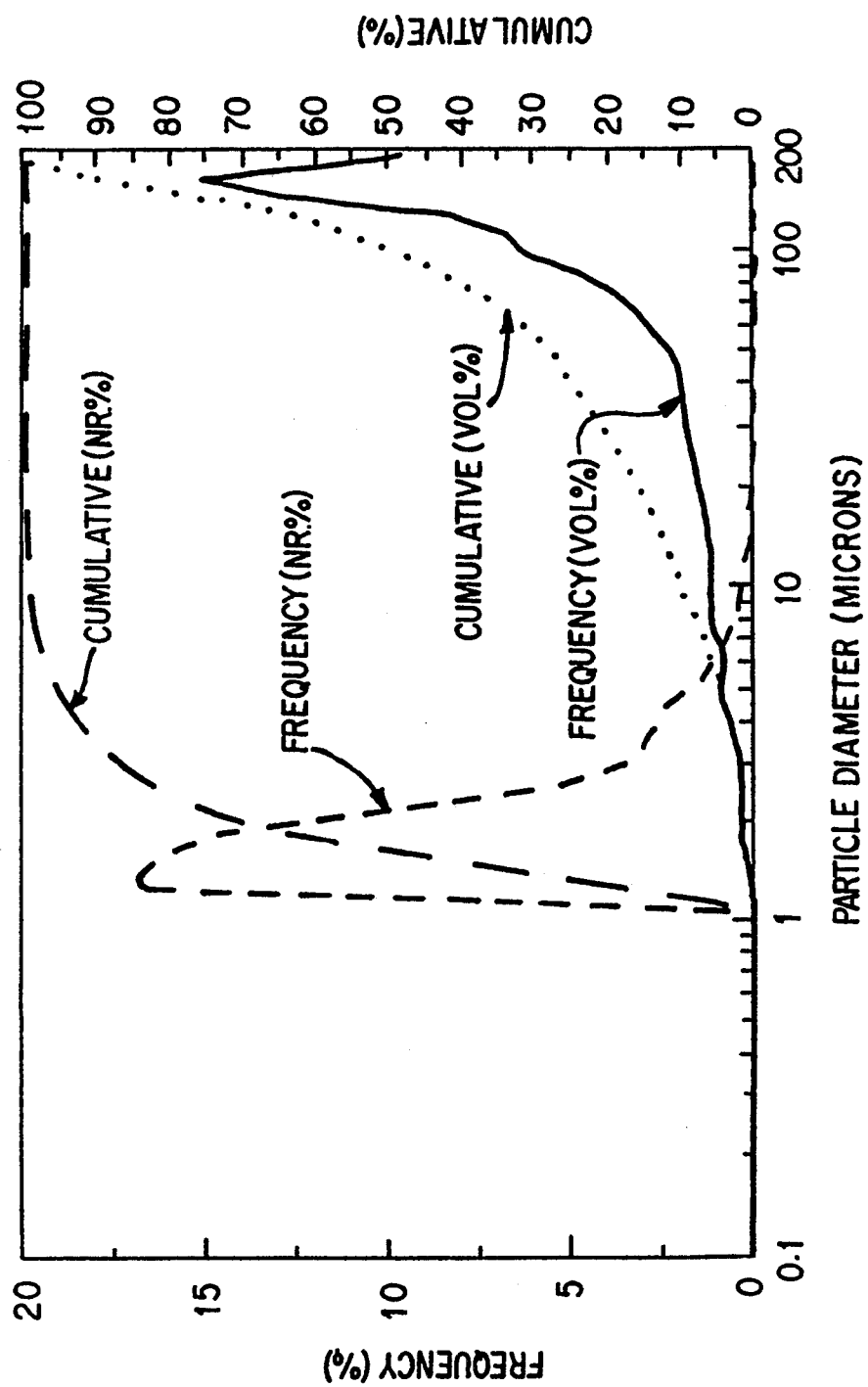
Figure 5:
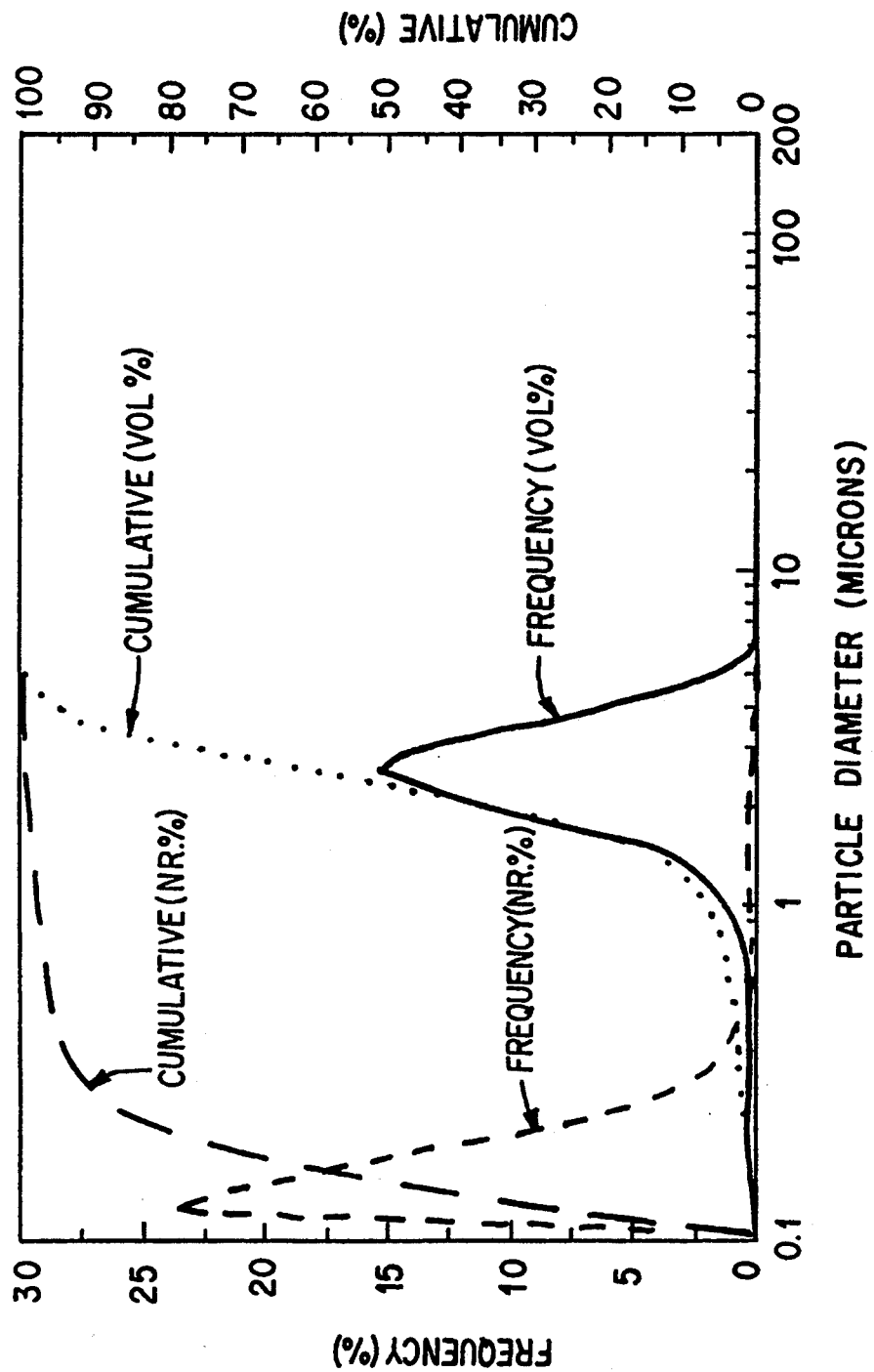
Figure 6:
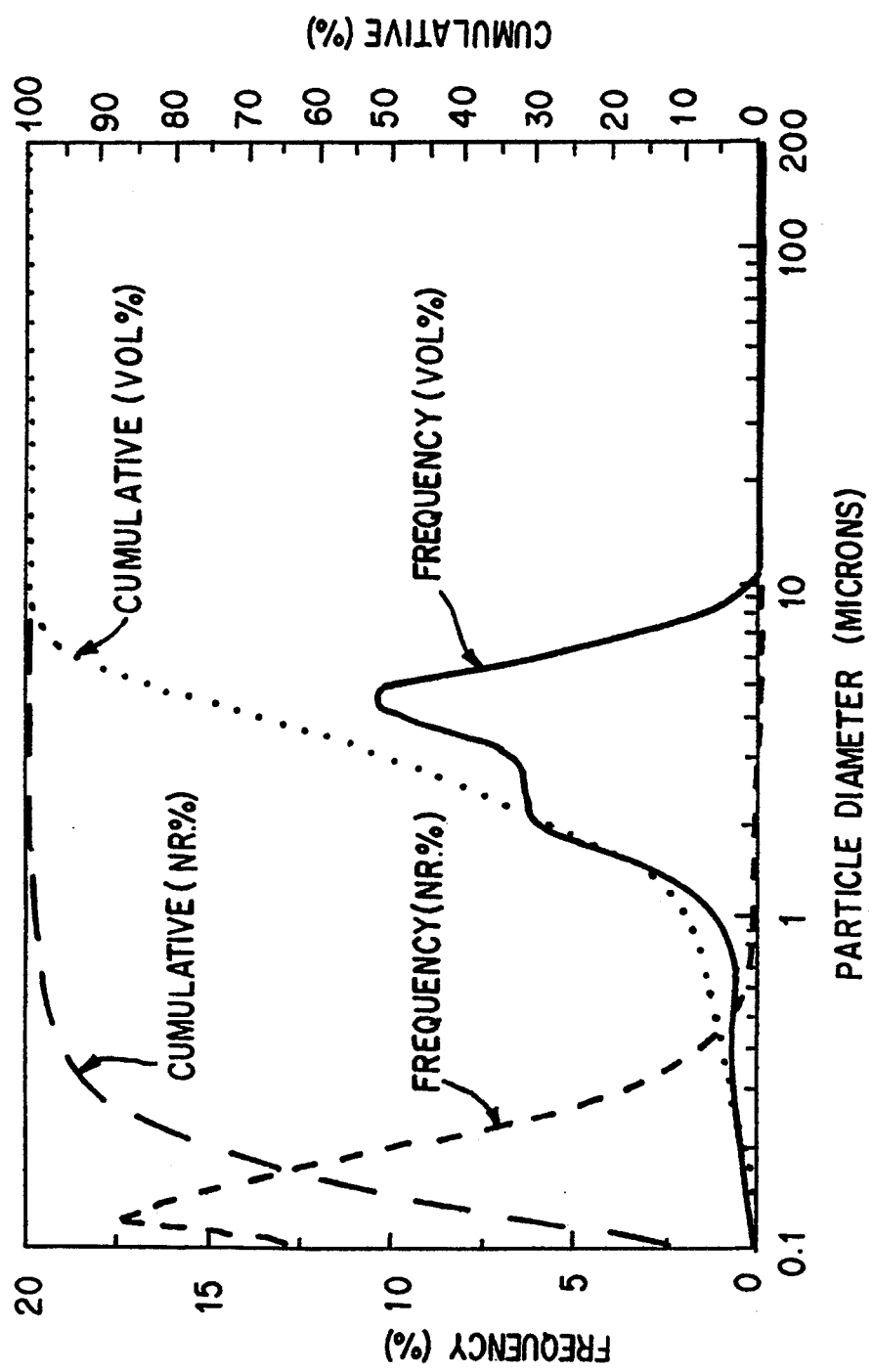

In an additional test, the particle size distribution (volume percent and number NR percent) of each of the pre-heat particles and post-heat particles were also determined for both the frequency and the cumulative percents versus particle diameter, without passing the particles through the 212 micron sieve. FIG. 3 shows that distribution for pre-heat particles of SIMPLESSE 100D (mean diameter by volume). FIG. 4 shows that distribution for post-heat particles. As can be seen from a comparison of FIGS. 3 and 4, a very substantial change in the particle size distribution took place by reason of the heat treatment.

Figure 7:
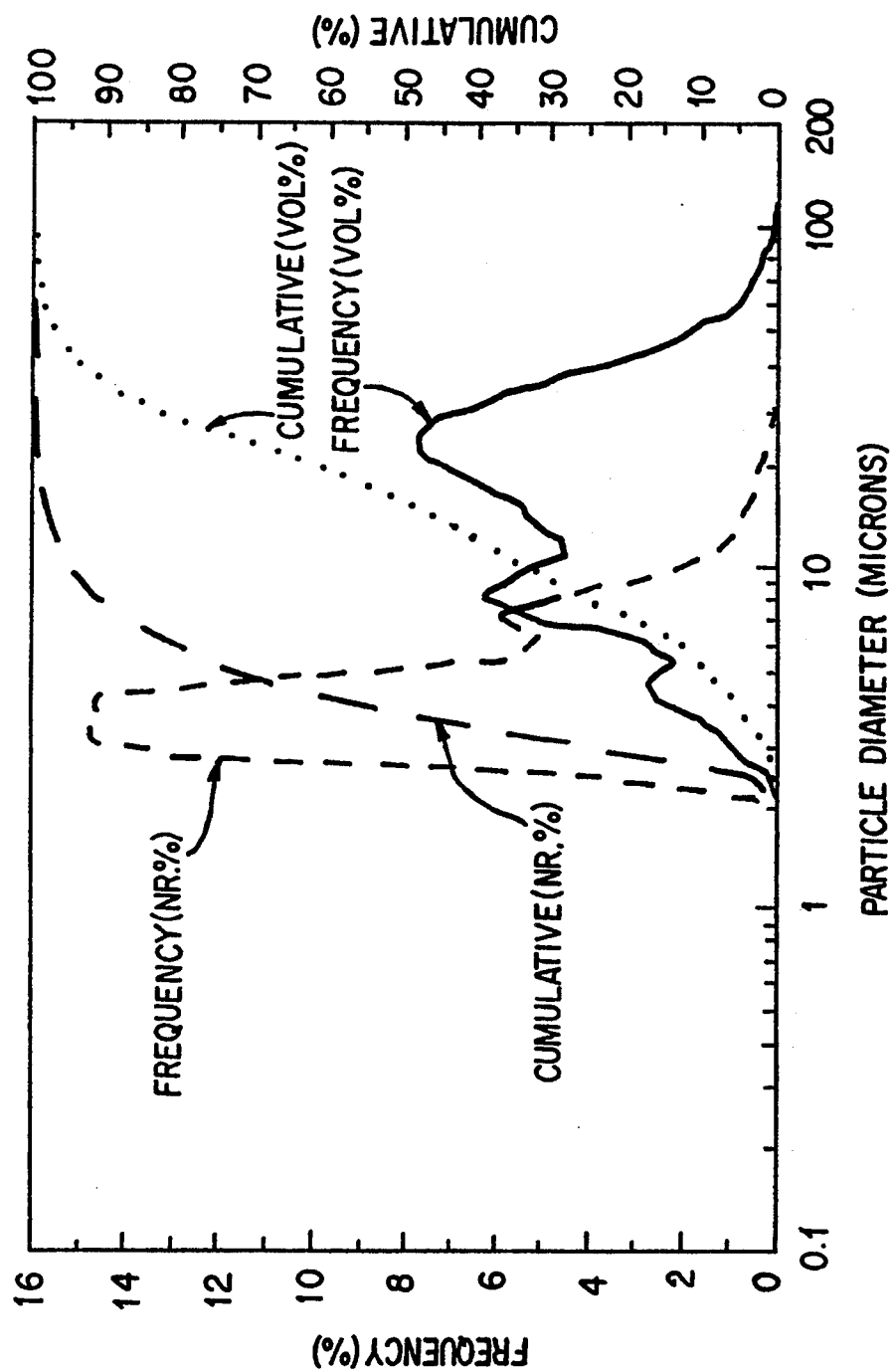
Figure 8:
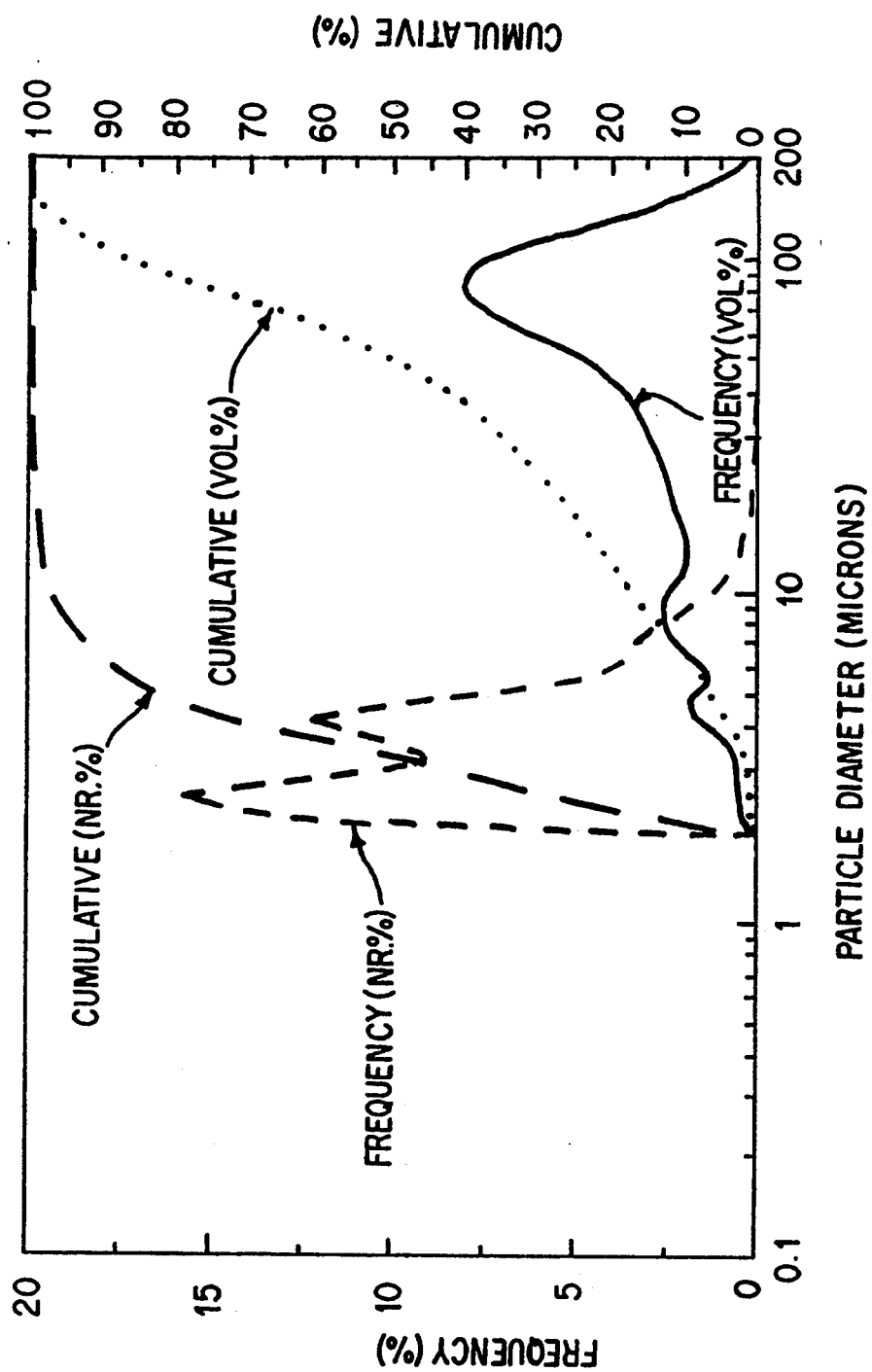
Figure 9:
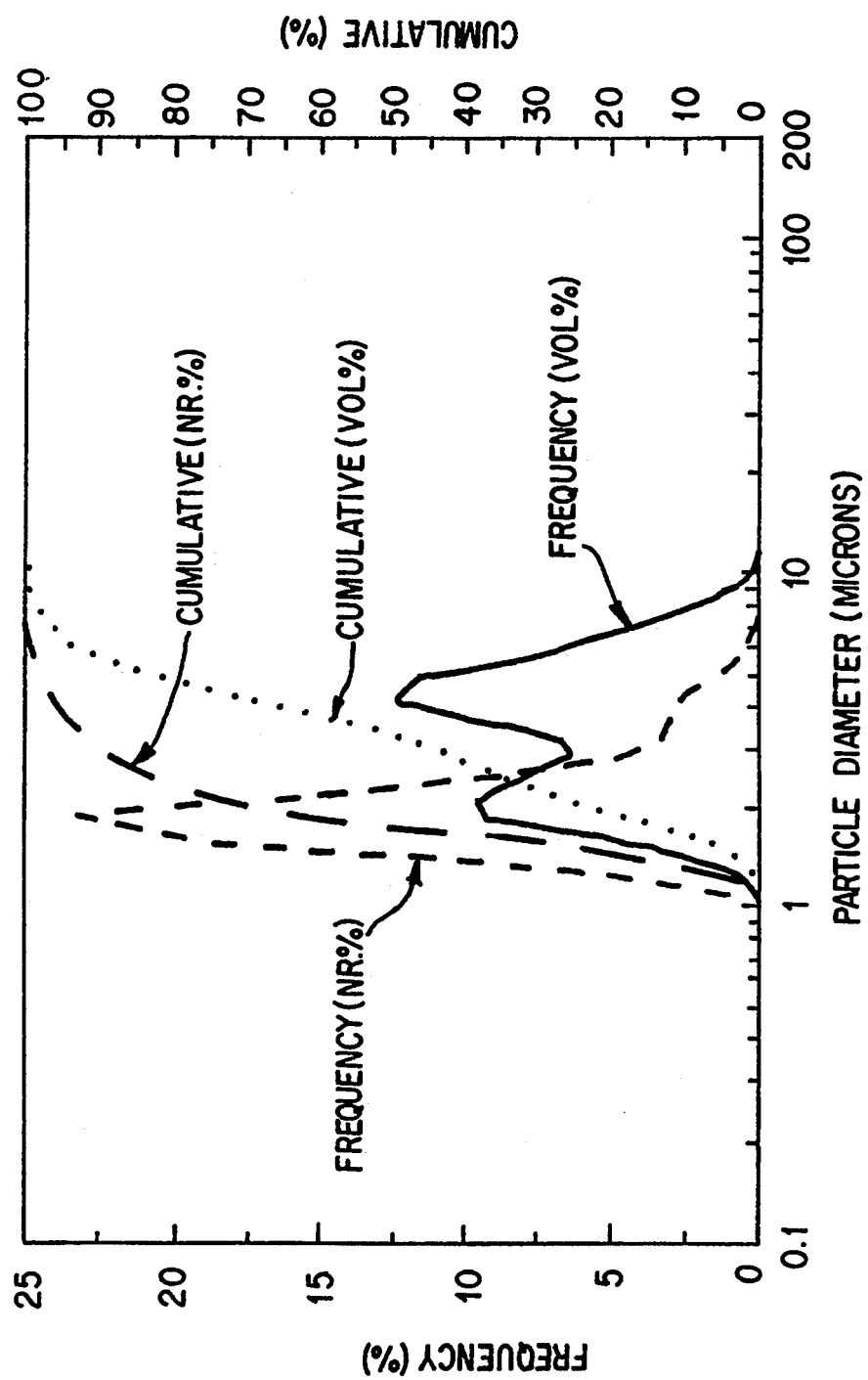
Figure 10:
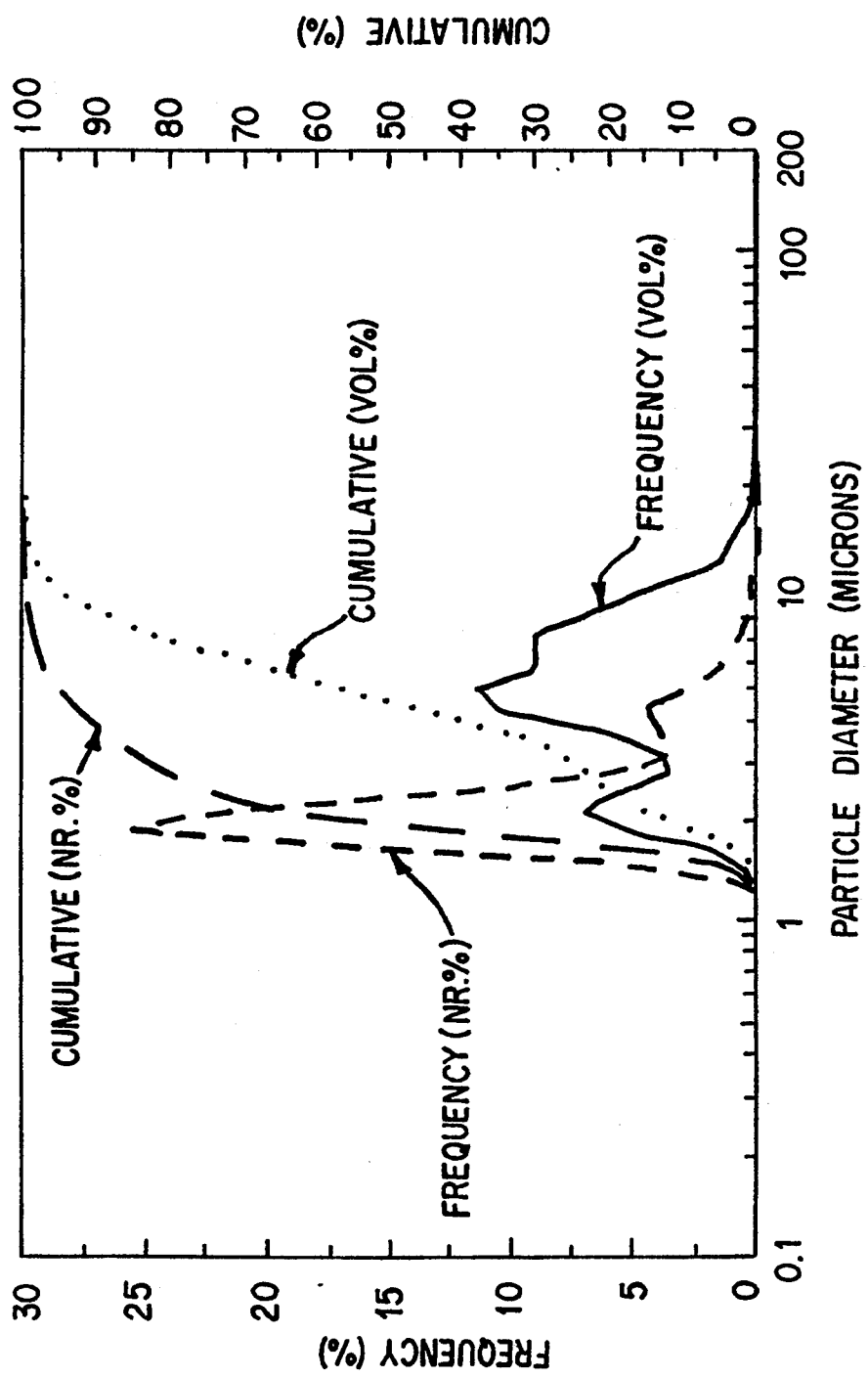

Similarly, the particle size distribution for pre-heat particles and post-heat particles was determined for the 1:1 whey protein/casein solution agglomerates, 100% whey protein solution agglomerates, and 3:1 whey protein/casein solution agglomerates, and the results are shown in FIGS. 5 through 10 (mean diameter by volume). By comparing FIGS. 5 and 6, it can be seen that the pre-heat particles and the post-heat particles for the 1:1 whey protein/casein did not change significantly. Similar comparisons of the 100% whey protein, shown in FIGS. 7 and 8, show that the distribution changed significantly, while the same comparisons of the 3:1 whey protein/casein, again, show that the particle size distribution did not change significantly, as demonstrated by FIGS. 9 and 10.

Accordingly, this example illustrates that the present invention is quite capable of producing water-dispersible, gravitational and heat-stable agglomerates as fat replacers for food. The example further shows the necessity of co-forming agglomerates of whey protein and casein to achieve these stabilities. The example further shows the very substantial improvement over the particles described in the Singer, et al patent.

EXAMPLE 2

Figure 11:
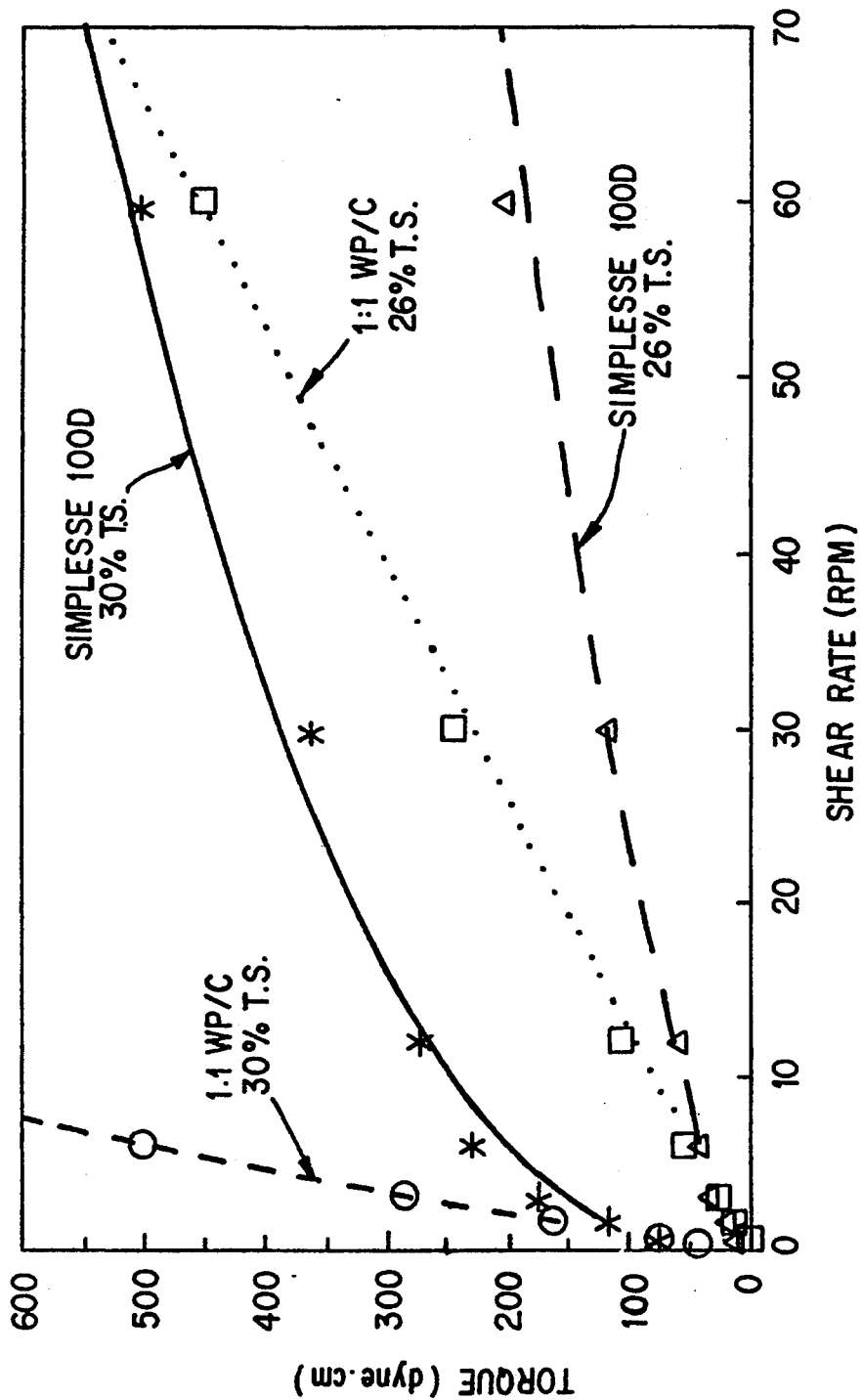

In this example, the rheology of 1:1 whey protein/casein (WP/C) solution agglomerates was compared with that of SIMPLESSE 100D. The tests were run with a helipath stand using a T-bar at 22° C. Samples of each at 30% total solids and 25% total solids were tested. FIG. 11 shows the results.

As can be seen from that Figure, SIMPLESSE 100D has a lower viscosity and significantly different rheological properties than the 1:1 WP/C. For example, at 26% total solids, the 1:1 WP/C is largely Newtonian with a flow index close to 1, i.e. the viscosity is substantially independent of shear rate, while the SIMPLESSE 100D is marked pseudoplastic with a flow index of about 0.66, i.e. the viscosity is lower at higher shear rates.

EXAMPLE 3

Figure 12:
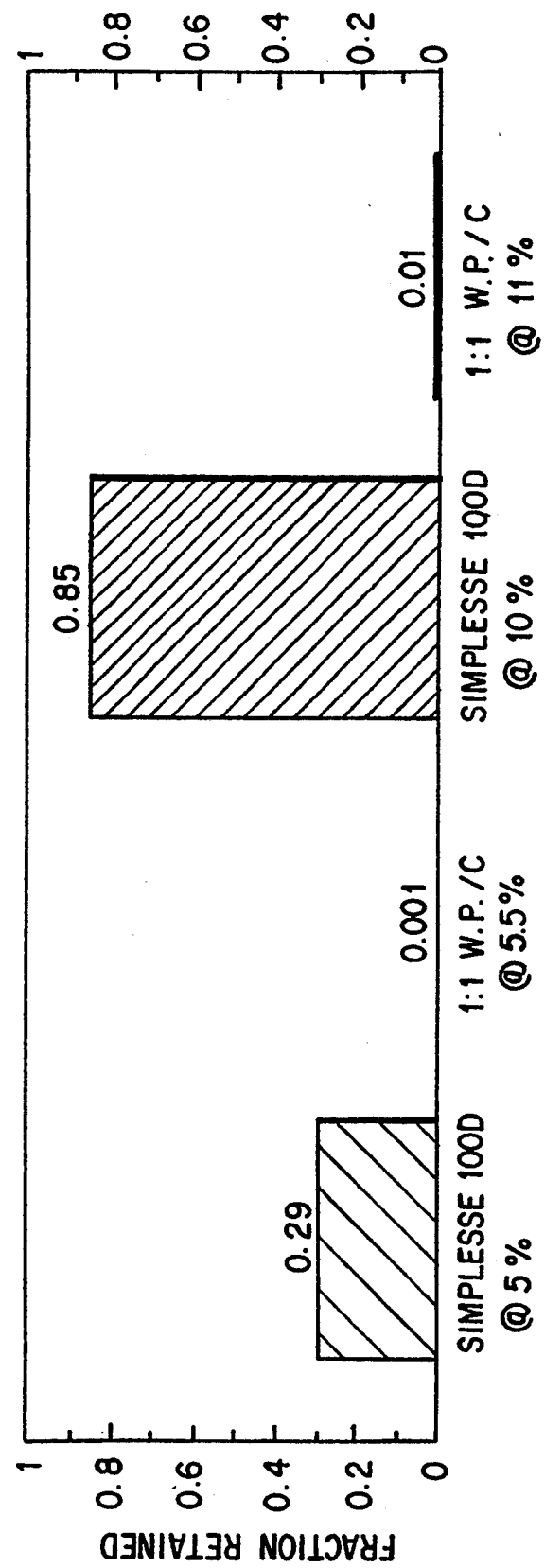

In this example, a whitened coffee beverage was prepared with SIMPLESSE 100D and 1:1 WP/C solution agglomerates, at two different but essentially equivalent concentrations in protein concentration, each of which concentrations provide similar whitening, i.e. to simulate a 1% fat level (5% SIMPLESSE 100D, 5.5% WP/C; and 10% SIMPLESSE 100D, 11% 1:1 WP/C). The whitened beverages were retorted at 121° C. for 10 minutes to simulate conditions necessary for canned, whitened coffee. The retorted coffee was cooled to room temperature and sediment was removed. The sediment was tested, as described above, for percent of oversized material using the 212 micron sieve, as described above. The results are shown in FIG. 12.

As can be seen from that Figure, the amount of oversized material of the 5% concentration of SIMPLESSE 100D was about 290 times that of the 5.5% concentration of 1:1 WP/C and the oversized material of the 10% concentration of SIMPLESSE 100D was about 85 times that of the 11% concentration of 1:1 WP/C. The SIMPLESSE 100D retorted coffee had large and unsightly coagulates in the coffee, while the 1:1 WP/C did not. The 1:1 WP/C coffee appeared perfectly homogenous. Note that the 5:5% sample of SIMPLESSE 100D was significantly worse than the 11% sample of 1:1 WP/C of the invention.

EXAMPLE 4

Figure 13:
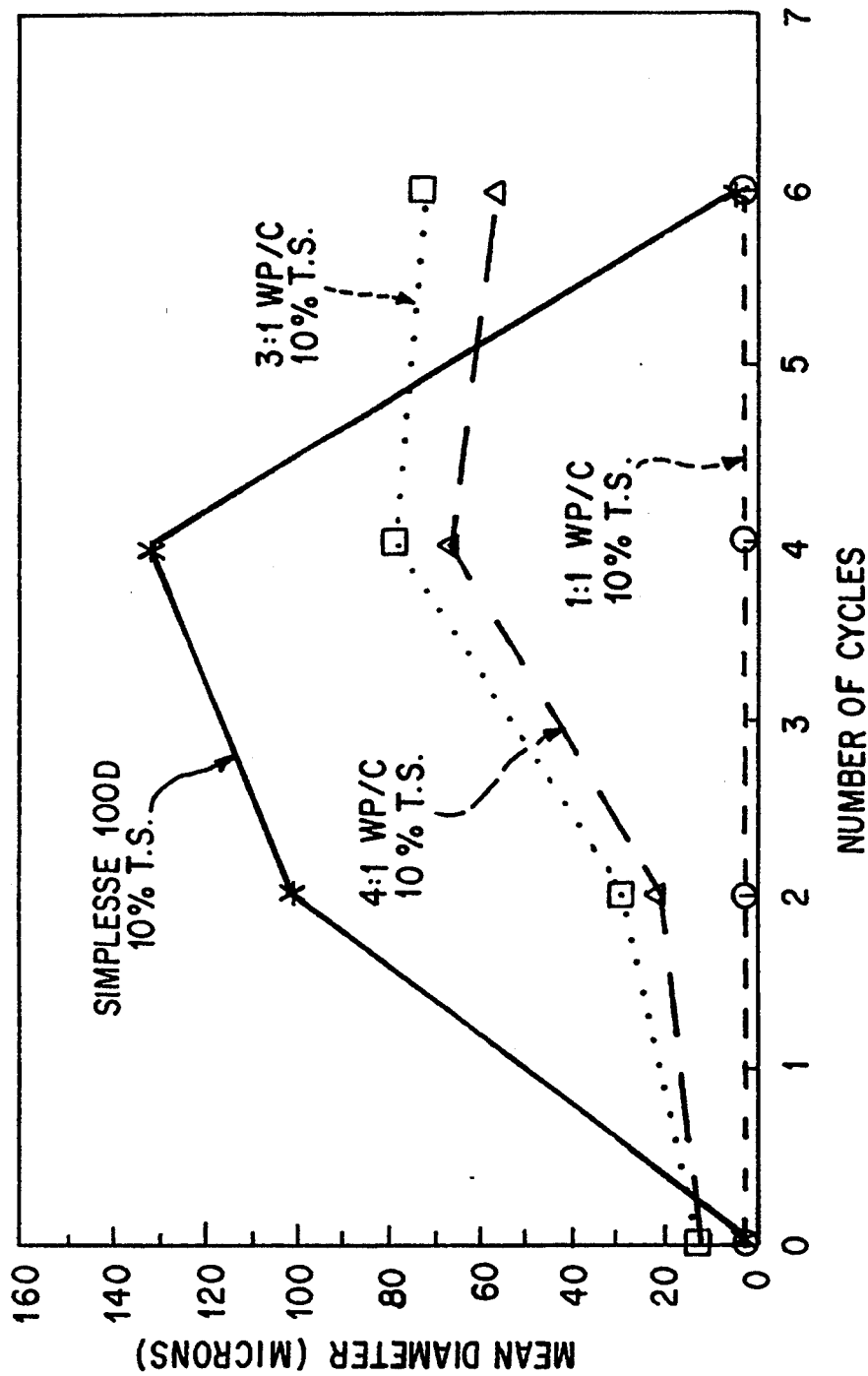

In this example, the freeze/thaw properties of SIMPLESSE 100D were compared to the 1:1 WP/C solution agglomerates and to 3:1 WP/C solution agglomerates, as described above, as well as to 4:1 WP/C solution agglomerates, prepared in the manner described in Example 1. In this test, 200 ml samples (10% total solids in water) were frozen overnight to about $-20°$ C. and then thawed to room temperature. This freeze/thaw cycle was then repeated for a total of six times. After each such freeze/thaw cycle, the mean particle diameter of the particles with respect to each sample was determined. The results are shown in FIG. 13.

As can be seen from that Figure, for the 1:1 WP/C sample, the freeze/thaw had essentially no effect on the mean diameter throughout all six cycles, while the 3:1 and 4:1 WP/C samples showed relatively small increases in mean diameter through two cycles, while the mean diameter of the SIMPLESSE 100D had about a 100 times increase through two cycles. The 3:1 and 4:1 WP/C samples showed additional increases in mean diameter from two cycles to four cycles, i.e. from about 27 microns to about 75 microns, while the SIMPLESSE 100D showed increases from about 100 microns to about 130 microns. Beyond four cycles, the 3:1 and 4:1 WP/C samples remained substantially stable, while the SIMPLESSE 100D had a dramatic decrease in mean diameter.

Figure 14:
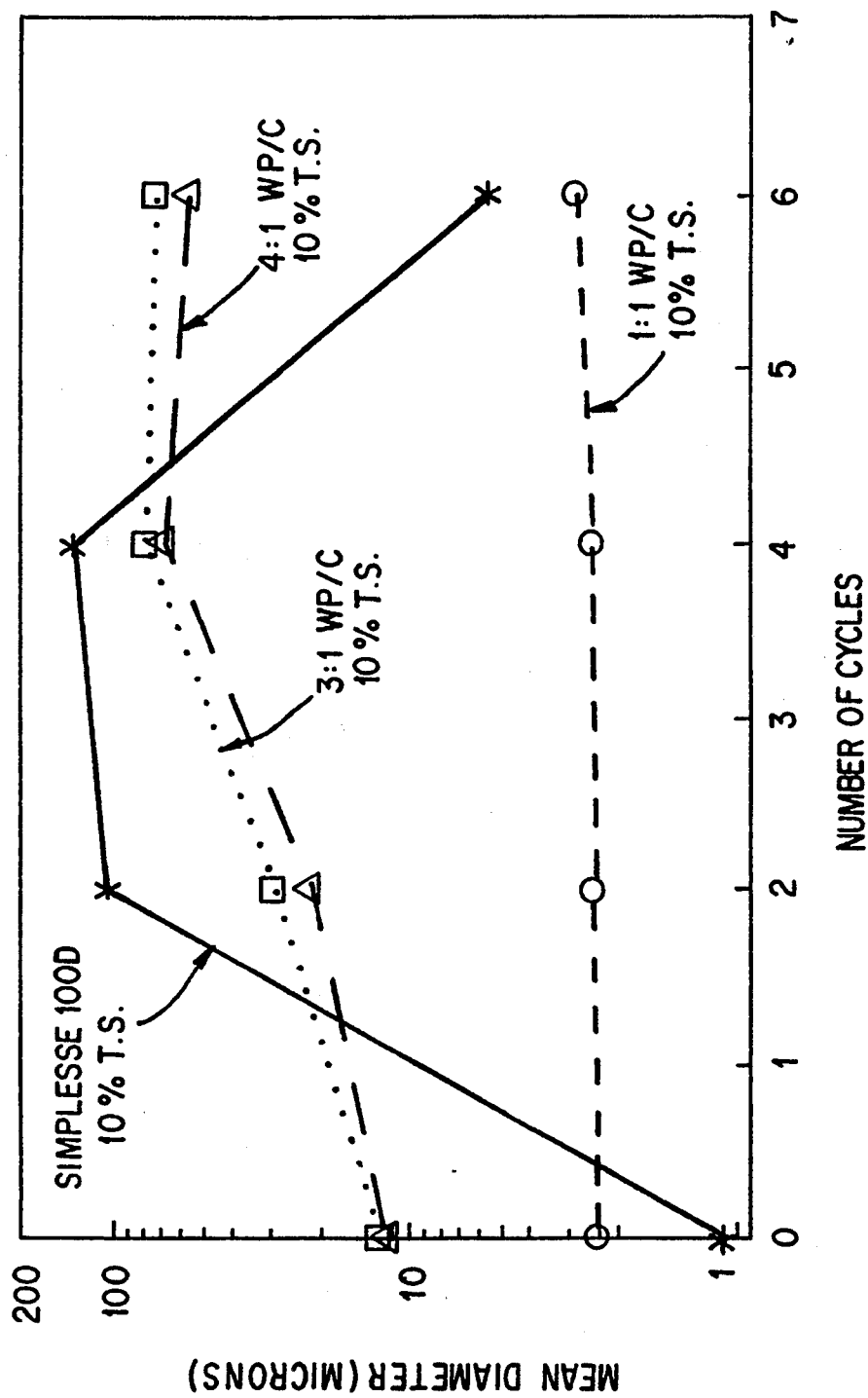

The same results are shown in FIG. 14, except in that Figure the mean diameter is shown in log scale.

EXAMPLE 5

The procedure of Example 1 was repeated except that hydrochloric acid was used instead of phosphoric acid. The product produced by this process was compared with the product of Example 1 by cooking each at 200° F. for one minute at a pH of 5.0. A 10% solids solution was prepared as described in Example 1, and the mean (volume weighted) diameter was determined. Thermal stability was then tested by heating at 10% solution of each sample to 212° F., cooling at ambient temperatures for about 2 hours and the volume weighted mean diameters in microns were determined.

Figure 15B:
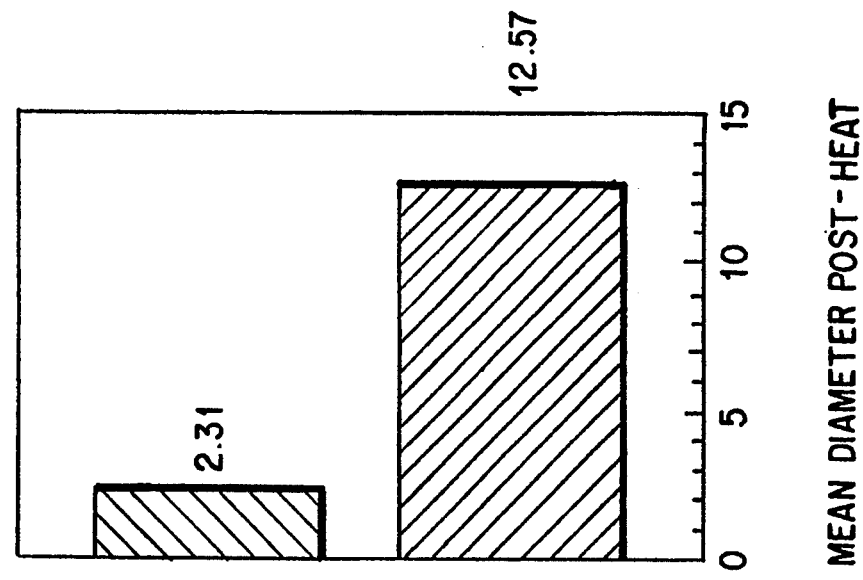
Figure 15A:
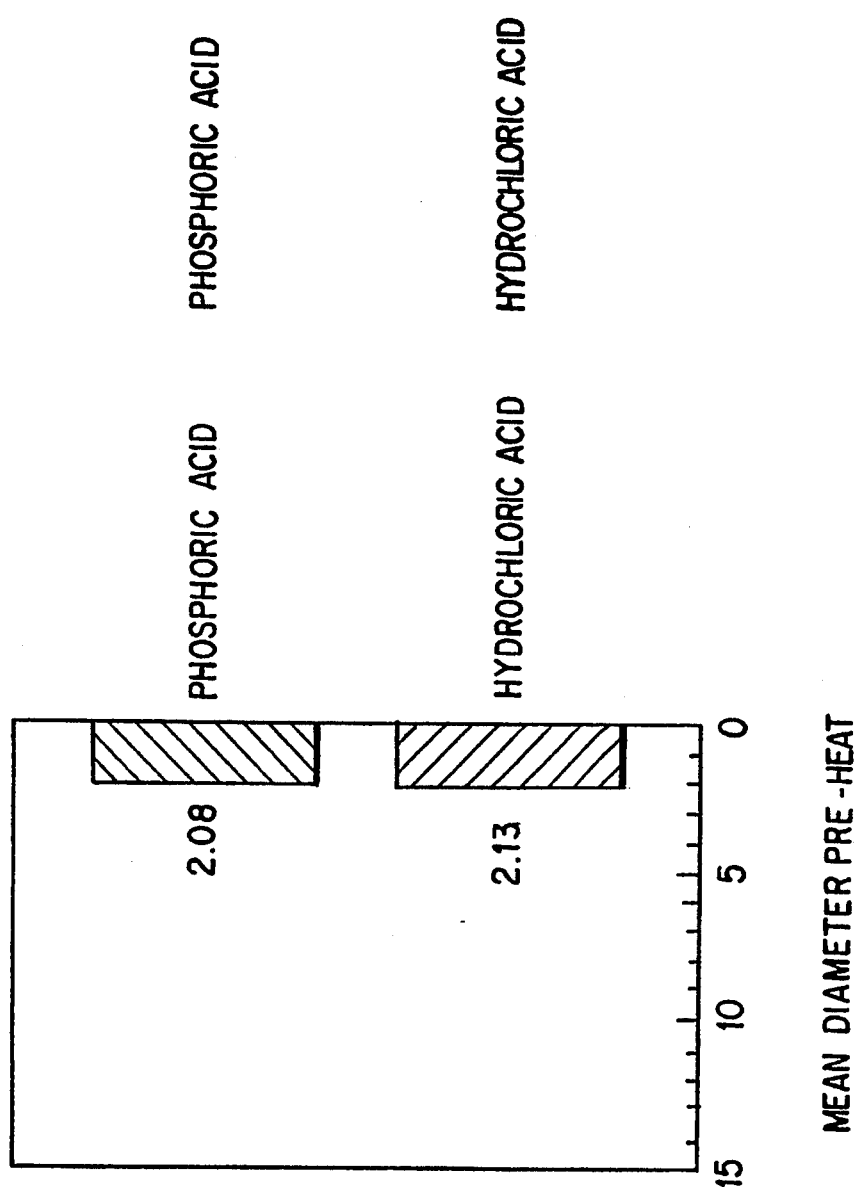

FIG. 15 shows the results, and it can be seen that phosphoric acid is notably superior to hydrochloric acid in the post-heat particle size.

EXAMPLE 6

The procedure of Example 1 was repeated except that the amount of acid used varied to provide a pH of 3.0, 4.6, 5.0 and 6.6 in separate repeats of the process. The pH during heating was varied while keeping the phosphate constant at about 3.3%. The pH was varied by using orthophosphoric acid or orthophosphate salt (disodium or monosodium) or adding up to about 1% HCl (10% solution) to reach the target pH while maintaining the 3.3% phosphate level. Similarly, hydrochloric acid was used without any phosphate being added to provide the same pHs in separate repeats of the process. The various repeats were then spray dried as in Example 1. The volume weighted mean diameter was determined for the rehydrated products of each repeat. Thereafter, the thermal stability was tested by heating to 95° C., and the mean diameter of each repeat was determined (mean diameters are volume weighted mean diameters in microns as are the same throughout this specification and the claims).

FIGS. 16 and 17 show the results, and it can be seen that phosphoric acid is superior.

EXAMPLE 7

Figure 18B:
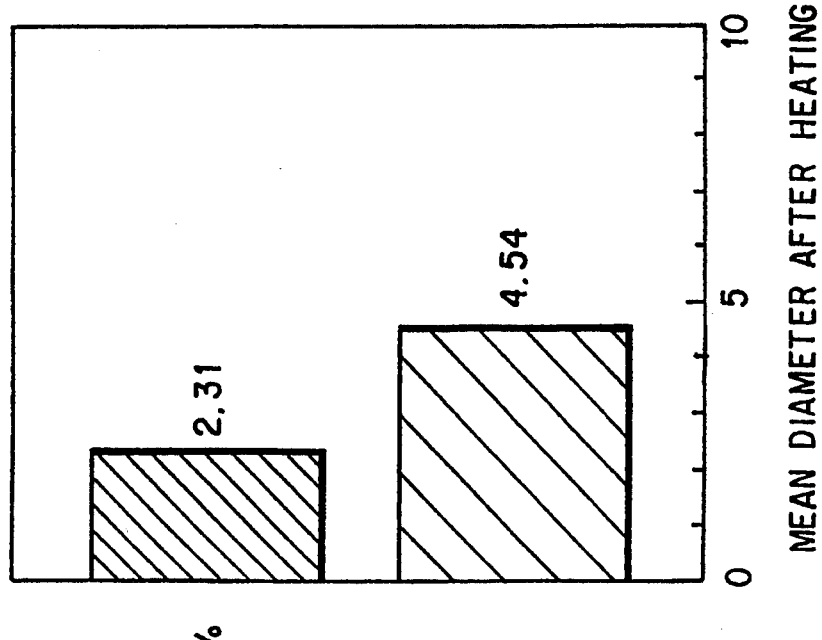
Figure 18A:
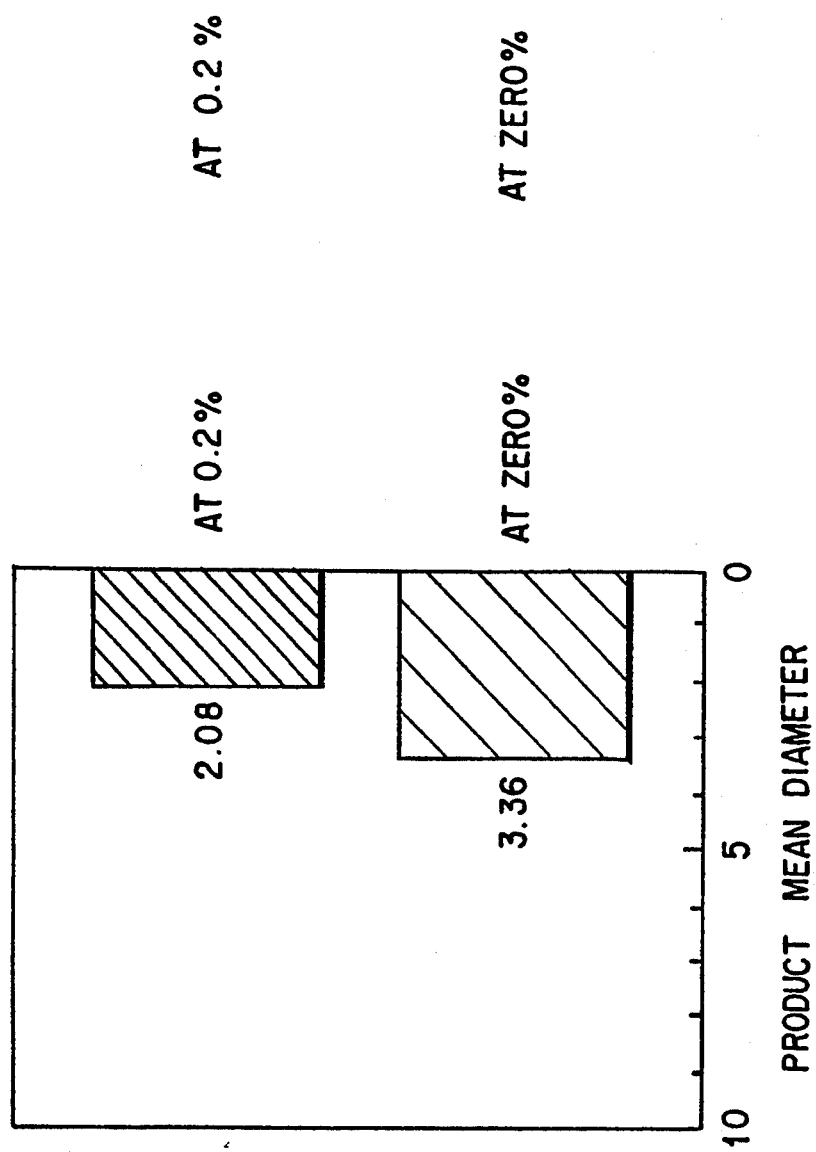

The procedure of Example 1 was repeated, except that 0.2% and 0% of the emulsifier was used. The spray dried products were reconstituted and allowed to hydrate. The products were evaluated for mean particle diameter and subsequently tested for thermal stability by heating at 95° C. and repeating the mean particle diameter evaluation, as described above. The results are shown in FIG. 18 and the beneficial effects of the emulsifier are clear.

In the above examples, the particle size measurement was performed by the following method.

Samples were mixed with distilled water and agitated on a magnetic stir plate at about 300 RPM at room temperature. The samples were allowed to hydrate for 30 minutes. Samples were then sonicated for one minute while circulating through 40w ultrasonic chamber at a flow rate of about 300 ml/min.

A Reichert-Jung Diastar microscope at ×1000 magnification and with a 200 division eye piece micrometer disc calibrated with a stage micrometer was used to determine particle sizes.

The particle size distributions and mean particle diameter was determined using a laser diffraction particle size distribution analyzer which is based on the Fraunhefer diffraction and mie scattering theories and measures particles in the 0.1 to 200 μm range at 56 different diameter ranges. For each diameter range, a mean diameter ($D_N$) was calculated. The volume weighted mean diameter (Dv) was calculated as follows:

$$D_V = \Sigma \frac{(D_N \times V_N)}{100}$$

where $V_N$ is the percentage of the volume which corresponds to the diameter $D_N$.

As the above examples demonstrate, the present agglomerates are far more thermally stable than the particles of the Singer, et al patent, and very substantially more stable than whey protein alone, even when the whey protein is processed with the present phosphates, calcium, pH and emulsifiers. The present agglomerates are very substantially more stable under shear, retort conditions and freeze/thaw cycles than the particles of the Singer, et al patent.

These improved properties provide successful use of the present agglomerates in a much wider range of food composition, while, also, the present agglomerates may be produced by a much more simple process, using conventional dairy equipment, as opposed to that of the Singer, et al patent. Hence, a substantial improvement in these fat replacers is provided by the present invention.

From the foregoing, it will be quite apparent to those skilled in the art that various changes and modification are intended by the above disclosure, and it is intended that those changes and modifications be embraced by the spirit and scope of the annexed claims.

What is claimed is:

1. A water-dispersible, heat-stable fat replacer composition for foods, comprising co-formed agglomerates of at least partially denatured whey protein and desolubilized casein, wherein the mean particle size of the agglomerates is about 0.5 μm to about 20 μm.

2. The composition of claim 1 wherein the agglomerates are formed from an aqueous mixture having a whey protein to casein ratio, on a protein to protein basis, of about 4:1 to 1:2.

3. The composition of claim 1 wherein a protein to protein ratio of whey protein to desolubilized casein in the agglomerates is about 9:1 to 1:2.

4. The composition of claim 2 wherein said ratio is about 2:1 to 2:3.

5. The composition of claim 3 wherein said ratio is about 4:1 to 3:2.

6. The composition of claim 2 wherein the whey protein is in the form of whey protein concentrate which has about 35% to 75% whey protein therein on a solids basis.

7. The composition of claim 2 wherein the casein is one or more of rennet casein, acid casein, sodium caseinate, potassium caseinate, magnesium caseinate, and calcium caseinate.

8. The composition of claim 7 wherein the casein at least includes calcium caseinate.

9. The composition of claim 1 wherein the mixture contains one or more of acetic, phosphoric, hydrochloric, sulfuric, citric, lactic and hypochloric acids.

10. The composition of claim 2, wherein the mixture contains a phosphate-producing acid.

11. The composition of claim 1 wherein the agglomerates contain a food-grade emulsifier.

12. The composition of claim 11 wherein the emulsifier is a stearate or oleate.

13. The composition of claim 11 wherein the emulsifier is sodium stearoyl-2-lactylate and/or polyglycerol mono-oleate.

14. The composition of claim 1 wherein the mean particle size of the agglomerates is between about 1.0 and 15 microns.

15. The composition of claim 1 wherein the mean particle size of the agglomerate is between about 1.0 and 7 microns.

16. The composition of claim 1 wherein the mean particle size of the agglomerate is less than about 3 microns.

17. The composition of claim 1 wherein the agglomerates contain a divalent cation.

18. The composition of claim 17 wherein the divalent cation is calcium.

19. The composition of claim 1 admixed with a food.

20. The composition of claim 19 wherein the food is a food which is intended to be heated.

21. The composition of claim 20 wherein the food is a gravy, beverage, soup, sauce, bread, pastry, coffee whitener or dessert.

22. A method for producing the co-formed agglomerates of claim 1, comprising:
    (a) preparing an aqueous mixture of whey protein and casein with a pH of about 3.0 to 6.6;
    (b) heating the mixture to a temperature sufficient to at least partially denature the whey protein and desolubilize at least a portion of the casein;
    (c) cooling the mixture to a temperature below the whey protein denaturing temperature; and
    (d) recovering the co-formed agglomerates.

23. The method of claim 22 wherein a protein to protein ratio of the whey protein to casein in the aqueous mixture is about 4:1 to 1:2.

24. The method of claim 22 wherein the whey protein is in the form of whey or whey protein concentrate or whey protein isolate.

25. The method of claim 22 wherein the casein is selected from the group consisting of rennet casein, acid casein, sodium caseinate, potassium caseinate, magnesium caseinate and calcium caseinate.

26. The method of claim 25 wherein the casein is at least in part calcium caseinate.

27. The method of claim 22 wherein the aqueous mixture has a pH between 3.0 and 5.9.

28. The method of claim 23 wherein said ratio is between about 2:1 to 2:3.

29. The method of claim 27 wherein one or more of acetic, phosphoric, hydrochloric, sulfuric, citric, lactic and hypochloric acid is added to the mixture.

30. The method of claim 27 wherein a phosphate-producing acid is added to the mixture.

31. The method of claim 22 wherein a divalent cation is added to the aqueous mixture.

32. The method of claim 31 wherein the cation is calcium.

33. The method of claim 23 wherein said ratio is about 1:1.

34. The method of claim 32 wherein the calcium is present in amounts of at least 0.1% of the weight of the resulting agglomerates.

35. The method of claim 22, wherein a food-grade emulsifier is added to the aqueous mixture.

36. The method of claim 35 wherein the amount of emulsifier is about 0.005% to about 1.0%.

37. The method of claim 36 wherein the emulsifier contains a stearine derivative emulsifier.

38. The method of claim 36 wherein the emulsifier is sodium stearoyl-2-lactylate and/or polyglycerol mono-oleate.

39. The method of claim 22 wherein the aqueous mixture contains a phosphate, a source of calcium and a food-grade emulsifier.

40. The method of claim 22 wherein the solids the aqueous mixture has a solids content of between 10% and 60%.

41. The method of claim 22 wherein the aqueous mixture is heated to a temperature between about 75° C. and 100° C. for about 0.5 to 40 minutes.

42. The method of claim 22 wherein the mixture is heated by injection of steam into the mixture.

43. The method of claim 22 wherein the mixture is cooled to a temperature below 70° C.

44. The method of claim 43 wherein the temperature is below 50° C.

45. The method of claim 22 wherein the co-formed agglomerates are recovered by one of filtration, centrifugation, decanting, ultrafiltration and drying.

* * * * *